(12) United States Patent
Zhou et al.

(10) Patent No.: US 11,991,798 B2
(45) Date of Patent: May 21, 2024

(54) TEMPERATURE SAMPLING DEVICE AND METHOD, TEMPERATURE PROTECTION DEVICE AND METHOD, AND LIGHTING SYSTEM

(71) Applicant: JIAXING SUPER LIGHTING ELECTRIC APPLIANCE CO., LTD, Jiaxing (CN)

(72) Inventors: Lin Zhou, Jiaxing (CN); Aiming Xiong, Jiaxing (CN)

(73) Assignee: Jiaxing Super Lighting Electric Appliance Co., Ltd., Zhejiang (CN)

( * ) Notice: Subject to any disclaimer, the term of this patent is extended or adjusted under 35 U.S.C. 154(b) by 5 days.

(21) Appl. No.: 17/785,796

(22) PCT Filed: Dec. 11, 2020

(86) PCT No.: PCT/CN2020/135541
§ 371 (c)(1),
(2) Date: Jun. 15, 2022

(87) PCT Pub. No.: WO2021/121137
PCT Pub. Date: Jun. 24, 2021

(65) Prior Publication Data
US 2023/0062239 A1    Mar. 2, 2023

(30) Foreign Application Priority Data

Dec. 16, 2019 (CN) .......................... 201911292542.X
Apr. 1, 2020 (CN) .......................... 202010248500.2

(51) Int. Cl.
*H05B 45/18* (2020.01)

(52) U.S. Cl.
CPC ................................. *H05B 45/18* (2020.01)

(58) Field of Classification Search
CPC ......... H05B 45/18; H05B 45/56; Y02B 20/30
See application file for complete search history.

(56) References Cited

U.S. PATENT DOCUMENTS

2016/0360582 A1   12/2016  Kato
2017/0150559 A1*   5/2017  Wang ..................... H05B 45/10

FOREIGN PATENT DOCUMENTS

CN    101470142 A    7/2009
CN    203340336 U    12/2013
(Continued)

*Primary Examiner* — Daniel D Chang
(74) *Attorney, Agent, or Firm* — Muir Patent Law, PLLC

(57) ABSTRACT

Disclosed are a temperature sampling device and method, a temperature protection device and method, and a lighting system. The temperature sampling device comprises: a temperature measurement unit and a signal processing unit, the temperature measurement unit having a measurement end and configured to change its own resistance under the influence of an ambient temperature change of a circuit to be protected, and the signal processing unit being coupled to the measurement end and configured to limit a measurement signal in the temperature measurement unit that is influenced by a resistance change so as to output a temperature sampling signal corresponding to the resistance change, wherein the temperature sampling signal is generated under the condition that the measurement signal is limited. The temperature sampling device and method, the temperature protection device and method, and the lighting system have simple structure and low costs. In addition, the temperature sampling device can be directly coupled to pins of switch power sources in the existing LED lighting systems, and therefore has high universality.

25 Claims, 13 Drawing Sheets

(56) References Cited

FOREIGN PATENT DOCUMENTS

| CN | 106131994 A | 11/2016 |
| CN | 208923823 U | 5/2019 |
| CN | 209589289 U | 11/2019 |

* cited by examiner

TEMPERATURE SAMPLING DEVICE AND METHOD, TEMPERATURE PROTECTION DEVICE AND METHOD, AND LIGHTING SYSTEM

TECHNICAL FIELD

This disclosure relates to the technical field of temperature protection devices, and more particularly, to a temperature sampling device, a temperature protection device and method, and a lighting system.

BACKGROUND

With the rapid development of power electronic technology and the improvement of living requirements of people, a variety of power devices applied in different environmental occasions and power supply solutions with extreme designs have also emerged increasingly. Accompanied with this trend, the endurance of the power electronic device is reduced due to the overly high temperature of the power electronic device under high-power operation, or an abnormal operation of the power electronic device may also occur by the failure of thermal components in the power electronic device due to the excessive temperature.

Taking the power electronic devices used in the lighting field as an example, LED lights used in outdoor lighting may have to operate at high power for a long period of time, the temperature of the LED lights would continue to rise during use. When the temperature is too high, the LED lights are easy to burn out if no additional measures are taken to cool down the LED lights. As another example, if the LED lamp of an indoor lighting has insufficient heat dissipation space, the LED lamp beads or the LED power supply to can easily be damaged due to the overheating of the LED lamp, the endurance of the LED driver is also affected.

Although temperature measurement can be implemented on some lamps by replacing an IC chip with temperature protection function, however, the existing drivers of the lamps would become unusable. Furthermore, issues such as poor compatibility and high cost may rise during designing different drivers for needs in different conditions.

SUMMARY

In view of the shortcomings of the above-mentioned related technologies, the purpose of this disclosure is to provide a temperature sampling device, a temperature protection device and method, and a lighting system.

In order to achieve the above and other related purposes, the first aspect of the present disclosure provides temperature sampling device comprising a temperature measurement unit and a signal processing unit. The temperature measurement unit has a measurement end and is configured to change a resistance value of the temperature measurement unit under influence of a change of an ambient temperature of a circuit to be protected. The signal processing unit is coupled to the measurement end and is configured to limit a measurement signal in the temperature measurement unit influenced by change of the resistance value, to output a temperature sampling signal corresponding to the change of the resistance value, wherein, the temperature sampling signal is generated under condition of the measurement signal is limited; and wherein, the temperature sampling signal is configured to be transmitted to a temperature protection device In some embodiments of the first aspect of the present disclosure, there is monotonicity exists between the change of the resistance value and the change of the ambient temperature.

In some embodiments of the first aspect of the present disclosure, the temperature sampling signal is outputted when the ambient temperature reaches an initial protection temperature.

In some embodiments of the first aspect of the present disclosure, monotonicity exists between the change of the temperature sampling signal and the change of the resistance value.

In some embodiments of the first aspect of the present disclosure, the signal processing unit transfers from a first state to a second state based on a change of the measurement signal, wherein, during the second state, the signal processing unit generates the temperature sampling signal.

In some embodiments of the first aspect of the present disclosure, the temperature measurement unit comprises a thermistor and a voltage dividing resistor connected in series, and the measurement end is located between the thermistor and the voltage dividing resistor.

In some embodiments of the first aspect of the present disclosure, the thermistor comprises a variable resistor and resistance of the variable resistor changes in a same direction as the ambient temperature changes.

In some embodiments of the first aspect of the present disclosure the thermistor comprises a variable resistor and resistance of the variable resistor changes in a reverse direction as the ambient temperature changes.

In some embodiments of the first aspect of the present disclosure, wherein the signal processing unit comprises an amplifying module and a feedback module. An input end of the amplifying module is coupled to the measurement end, a first reference signal is fed into a reference end of the amplifying module, and the output end of the amplifying module outputs the temperature sampling signal. The feedback module is coupled between the measurement end and the output end of the amplifying module and is configured to feed back a feedback signal generated based on the temperature sampling signal to the measurement end to limit change of the measurement signal, wherein, the amplifying module amplifies a signal received by the input end based on the limited measurement signal to output the temperature sampling signal.

In some embodiments of the first aspect of the present disclosure, the feedback module is configured to determine that a variation range of the resistance value of the temperature measurement unit corresponds to a preset signal magnitude variation range of the temperature sampling signal.

In some embodiments of the first aspect of the present disclosure, the amplifying module comprises a transistor connected to a circuit between the reference end and the output end of the amplifying module, and a control end of the transistor is coupled to the input end of the amplifying module.

In some embodiments of the first aspect of the present disclosure, the amplifying module comprises at least two cascaded transistors, a control end of a first-stage transistor is coupled to the measurement end, and a last-stage transistor is connected to a circuit between the reference end and the output end of the amplifying module.

In some embodiments of the first aspect of the present disclosure, the amplifying module comprises an operational amplifier, two input ends of the operational amplifier are respectively coupled to the input end and the reference end of the amplifying module, and an output end of the operational amplifier is coupled to the output end of the amplifying module.

In some embodiments of the first aspect of the present disclosure, temperature sampling device further comprises an output unit coupled to an output end of the signal processing unit to output the temperature sampling signal.

In some embodiments of the first aspect of the present disclosure, wherein the output unit comprises: a voltage follower module, an input end of the voltage follower module is coupled to the output end of the signal processing unit, the reference end of the voltage follower module receives a second reference signal, and an output end of the voltage follower module outputs the temperature sampling signal.

In some embodiments of the first aspect of the present disclosure the voltage follower module comprises: a transistor connected between the input end and the reference end of the voltage follower module, and the transistor is further connected to the output end of the voltage follower module to output the temperature sampling signal.

In some embodiments of the first aspect of the present disclosure, the temperature sampling device further comprises a filter unit, coupled to an output end of the signal processing unit, and configured for signal filtering.

In some embodiments of the first aspect of the present disclosure, the circuit to be protected comprises at least one of the following: a switching power supply, an electronic component that performance thereof is reduced/lost by heat, or an LED load circuit.

A second aspect of the present disclosure provides a temperature protection device, including: a temperature sampling device and a temperature protection unit as disclosed in any embodiment of the first aspect. The temperature sampling device is configured to measure an ambient temperature of a circuit to be protected and output a temperature sampling signal. The temperature protection unit is coupled to the temperature sampling device to obtain the temperature sampling signal and provides a temperature protection operation corresponding to a change of the ambient temperature of the circuit to be protected.

In some embodiments of the second aspect of the present disclosure, the circuit to be protected comprises a switching power supply, an electronic component that performance thereof is reduced/lost by heat, or an LED load circuit.

In some embodiments of the second aspect of the present disclosure, the temperature protection unit comprises a driving module of a load coupled to the temperature sampling device and the temperature protection operation comprises: performing an operation to reduce an outputting power to the load based on the temperature sampling signal.

In some embodiments of the second aspect of the present disclosure the driving module comprises: a driving control circuit with a feedback pin, and the temperature sampling signal is transmitted to the feedback pin.

In some embodiments of the second aspect of the present disclosure, the driving module comprises any one of the following: a circuit structure based on BUCK circuit architecture, a circuit structure based on BOOST circuit architecture, and a circuit structure based on BOOST-BUCK circuit architecture.

In some embodiments of the second aspect of the present disclosure wherein the temperature sampling signal is different from a feedback signal obtained by the driving module and the feedback signal reflects power supply of the load.

In some embodiments of the second aspect of the present disclosure, the driving module further comprises a switch circuit, and a control signal outputted by the driving control circuit to the switch circuit changes corresponding the change of the temperature sampling signal.

In some embodiments of the second aspect of the present disclosure wherein the temperature protection unit comprises a heat dissipation module, disposed at the circuit to be protected and coupled to the temperature sampling device; and the heat dissipation module performs a heat dissipation operation based on the temperature sampling signal.

In some embodiments of the second aspect of the present disclosure the temperature protection device is installed in an LED lighting system.

In some embodiments of the second aspect of the present disclosure, the temperature protection unit comprises a dimming module coupled to the temperature sampling device; and the dimming module configured to output a dimming signal to reduce a brightness of a LED load circuit in the LED lighting system based on the temperature sampling signal.

In some embodiments of the second aspect of the present disclosure, the LED lighting system comprises: a lighting system with an output power higher than 30 W.

A third aspect of the present disclosure discloses an LED lighting system, comprising: the temperature sampling device disclosed in any embodiment of the first aspect, an LED load circuit, and a switching power supply. The LED load circuit is driven by DC power supply. The switching power supply is coupled to the LED load circuit and is configured to convert an AC signal provided by an external AC power supply into a power supply signal for the LED load circuit, wherein, the switching power supply is further coupled to the temperature sampling device, and performs an operation of reducing the output power to the LED load circuit based on the temperature sampling signal provided by the temperature sampling device.

In some embodiments of the third aspect of the present disclosure, the switching power supply comprising: a rectifier module, configured to rectify the AC signal and output a rectified signal; a filter module, coupled to the rectifier module and configured to filter the rectified signal and output the rectified signal; and a driving module, coupled to the filter module, and configured to perform a power conversion to the filtered rectified signal to supply to the LED load, wherein, the driving module is further coupled to the temperature sampling device, and performs an operation of reducing the output power to the LED load circuit based on the temperature sampling signal.

In some embodiments of the third aspect of the present disclosure, the driving module comprises: a driving control circuit with a feedback pin, and the temperature sampling signal is transmitted to the feedback pin.

In some embodiments of the third aspect of the present disclosure, wherein the driving module comprises any one of the following: a circuit structure based on BUCK circuit architecture, a circuit structure based on BOOST circuit architecture, and a circuit structure based on the BOOST-BUCK circuit architecture.

In some embodiments of the third aspect of the present disclosure the temperature sampling signal is different from a feedback signal obtained by the driving module and the feedback signal the power supply of the LED load circuit.

In some embodiments of the third aspect of the present disclosure, the driving module further comprises a switch circuit, and a control signal outputted by the driving control circuit to the switch circuit changes corresponding to the change of the temperature sampling signal.

In some embodiments of the third aspect of the present disclosure, the LED lighting system further comprising an activation protection circuit, coupled between the measurement end of the temperature measurement unit in the temperature sampling device and the reference end of providing the first reference signal, and configured to activate a protection to the LED load circuit based on the temperature sampling signal when the LED lighting system is powered on and enabled.

In some embodiments of the third aspect of the present disclosure, the LED lighting system comprises: a lighting system with an output power higher than 30 W.

The fourth aspect of the present disclosure discloses a temperature sampling method, which is adapted to a temperature sampling device, wherein the temperature sampling device comprises a circuit and the circuit changes a resistance value under influence of a change of an ambient temperature, and the temperature sampling method comprising: limiting a measurement signal in the temperature sampling device, the measurement signal being under influence of the change of the resistance value; and outputting a temperature sampling signal influenced by the change of the resistance value, wherein the temperature sampling signal is generated under condition of the measurement signal is limited.

A fifth aspect of the present disclosure discloses a temperature protection method, comprising the following steps of: limiting a measurement signal influenced by change of the resistance value in the temperature sampling device; outputting a temperature sampling signal corresponding to the change of the resistance value, wherein the temperature sampling signal is generated under condition of the measurement signal is limited; and performing a temperature protection operation to the LED lamp based on the temperature sampling signal.

In some embodiments of the fifth aspect of the present disclosure, wherein the step of performing a temperature protection operation on the LED lamp based on the temperature sampling signal comprises at least one of the following: reducing a supply power from a switching power supply in the LED lamp based on the temperature sampling signal; adjusting a dimming signal outputted by a dimming module in the LED lamp based on the temperature sampling signal to reduce a brightness of the LED lamp when the temperature rises; or performing a heat dissipation operation based on the temperature sampling signal by a heat dissipation device provided at the circuit to be protected of the LED lamp.

In summary, the temperature sampling device, temperature protection device and method, and lighting system provided in the present disclosure can sense the ambient temperature of the LED load circuit through thermistors and achieve the effect of cooling the LED load circuit by reducing the output power, which is low cost, energy saving and safe. In addition, the temperature sampling device can be directly coupled with the pins of the switching power supply in the existing LED lighting system. There is no need to modify the circuit of the switching power supply in the LED lighting system and the temperature protection function has strong versatility, which can be realized without additional design of a suitable circuit or chip.

DESCRIPTION OF DRAWINGS

The specific features involved in this disclosure are shown in the appended claims. The characteristics and advantages involved in this disclosure can be better understood by referring to the exemplary embodiments and the accompanying drawings described in detail below. A brief description of the drawings is as follows:

DETAILED DESCRIPTION

Figure 1:
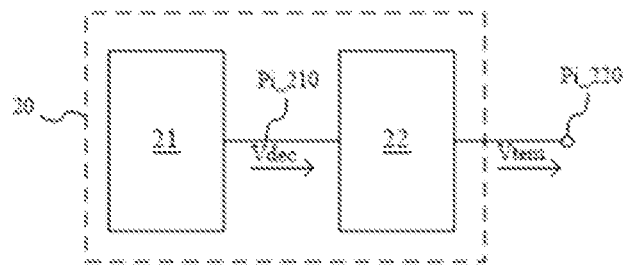
FIG. 1 depicts a schematic circuit block diagram of a temperature sampling device in accordance with an embodiment of the present disclosure.

The following specific examples illustrate the implementation of the present disclosure. Those skilled in the art can easily understand the other advantages and effects of the present disclosure from the content disclosed in this specification.

In the following description, with reference to the accompanying drawings, the accompanying drawings describe several embodiments of the present disclosure. It should be understood that other embodiments can also be used, and mechanical, structural, electrical, and operational changes can be made without departing from the spirit and scope of the present disclosure. The following detailed description should not be considered restrictive, and the scope of the embodiments of the present disclosure is limited only by the claims of the published application. The terms used herein are only for describing specific embodiments and are not intended to limit the disclosure. Space-related terms, such as "upper", "lower", "left", "right", "below", "below", "lower", "above", "upper", etc., can be used in the text for ease of explaining the relationship between one element or feature shown in the figure and another element or feature.

Although the terms "first", "second", . . . etc. are used herein to describe various elements or parameters in some examples, these elements or parameters should not be limited by these terms. These terms are only used to distinguish one element or parameter from another element or parameter. For example, the first input end may be referred to as the second input end, and similarly, the second input end may be referred to as the second input end without departing from the scope of the various described embodiments. The first input end and the second input end are both describing one input end, but unless the context clearly indicates otherwise, they are not the same input end. Similar situations also include the first rectifier output end and the second rectifier output end, or the first filtered output end and the second filtered output end.

Furthermore, as used herein, the singular forms "a", "an" and "the" are intended to also include the plural forms, unless the context dictates to the contrary. It should be further understood that the terms "comprising" and "including" indicate the presence of the described features, steps, operations, elements, components, items, types, and/or groups, but do not exclude one or more other features, steps, operations, The existence, appearance or addition of elements, components, items, categories, and/or groups. The terms "or" and "and/or" used herein are interpreted as inclusive or mean any one or any combination. Therefore, "A, B or C" or "A, B and/or C" means "any of the following: A; B; C; A and B; A and C; B and C; A, B and C." An exception to this definition will only occur when the combination of elements, functions, steps or operations is inherently mutually exclusive in some way.

In addition, it should be noted that, in order to clarify the features of each invention disclosed in this application, this article uses multiple embodiments to describe each embodiment as follows. However, it does not mean that each embodiment can only be implemented separately. Those skilled in the art can collocation and design feasible implementation examples based on requirements, or only replace the replaceable components/modules in different embodiments based on design requirements. In other words, the implementation mode taught in this case is not limited to the aspects described in the following examples, but also includes substitution, permutation and combination of the various embodiments/components/modules where feasible, which is described here first.

Electronic components have a wide range of applications, not only in general industry, but also in transportation, household appliances, and power supplies for electronic devices. When electronic components are working at high power or in working conditions for a long time, heat will be generated. When the heat accumulates and causes the temperature to be too high, it is easy to cause the life of the electronic components to be reduced, or to make some temperature-sensitive electronic components fail, thereby affecting the normal operation of the entire electronic device. Especially for the lighting equipment that occupies a prominent position in household appliances, when it works beyond the safety threshold, not only the life of the light source itself is greatly reduced, but also the performance of the driver that drives the light source is also degraded or even damaged.

As discussed herein, electronic components are components of electronic components and small machines and instruments. They are often composed of several parts. Electronic components include: resistors, capacitors, inductors, potentiometers, electron tubes, radiators, electromechanical components, and connectors. Semiconductor devices, electro-acoustic devices, laser devices, electronic display devices, optoelectronic devices, sensors, power supplies, switches, electronic transformers, relays, integrated circuits, various circuits, etc.

Taking a switching power supply as an example, it is used as an electrical energy conversion device to convert AC power provided by the mains power into low-voltage DC power, which can be, for example, a power adapter, a driver, or a driver chip of an electronic device. The electronic components in the switching power supply could be degraded or lose efficiency due to heat. For example, the electrolyte in an electrolytic capacitor may dry up due to the high temperature, such that the capacity of the electrolytic capacitor may decrease or be disabled. Take an electrolytic capacitor with an operating temperature limit of 85° C. as an example, when it works at a temperature of 20° C., generally 181019 hours of normal working time could be guaranteed, and when working at the limit temperature of 85° C., generally, only 2000 hours of normal working time of could be guaranteed. As another example, voltage-current characteristic of a diode changes due to the influence of temperature. Taking a room temperature of 26° C. as a reference, when the forward current of the diode remains unchanged, for every 1° C. increases in temperature, the forward voltage drops by 2-2.5 mV. The reverse current would be doubled for every 10° C. increased in temperature. Yet another example, the insulation performance of inductors, transformers, chokes, etc. would decrease as the temperature rises. Taking a LED load circuit as an example, the LED load circuit includes a plurality of LED lamp beads. When the temperature of the LED lamp beads exceeds 100° C., the working lifetime of the LED lamp beads would be greatly reduced.

In view of this, the present disclosure provides a temperature sampling device, a temperature protection device and method, and a lighting system to solve the aforementioned problems. In order to make the aforementioned objectives, features and advantages of the present disclosure more obvious and understandable, the details of implementations of the present disclosure are set forth in the accompanying drawings and the description below. The following descriptions of the embodiments of the present disclosure are for illustrative purposes only and are not meant to represent all the embodiments of the present disclosure or limit the present disclosure to specific embodiments. In addition, the same element numbers can be used to represent the same, corresponding or similar elements, and are not limited to represent the same elements.

In possible implementations, the present disclosure provides a temperature sampling device, and details of the proposed temperature sampling device will be described below with reference to FIGS. 1-12C. Please refer to FIG. 1, which depicts a circuit block diagram of a temperature sampling device in accordance with an embodiment of the present disclosure. As shown in the figure, the temperature sampling device 20 includes a temperature measurement unit 21 and a signal processing unit 22. The temperature measurement unit 21 has a measurement end Pi_210, and the temperature measurement unit 21 changes its own resistance value under the influence of ambient temperature change of the circuit to be protected (not shown) to output the measurement signal Vdec at the measurement end Pi_210. The signal processing unit 22 is coupled to the measurement end Pi_210 and is configured to limit the measurement signal Vdec in the temperature measurement unit 21 that is influenced by the change of the resistance value, to output the temperature sampling signal Vtem corresponding to the change of the resistance value on a signal output end Pi_220 of the signal processing unit 22.

As discussed herein, the circuit to be protected refers to a circuit structure built by electronic components, which may change its own circuit characteristics under the influence of temperature, e.g., reduce circuit life, or damage circuit functions. The electronic components include, but are not limited to, resistors, capacitors, inductors, and other basic components, as well as semiconductor devices such as power tubes, integrated circuits, etc. The circuit to be protected is exemplified by at least one of the aforementioned switching power supply, electrolytic capacitor, and LED load circuit.

The temperature measurement unit 21 is integrally disposed near the circuit to be protected, or the thermal element in the temperature measurement unit 21 is disposed near the circuit to be protected, so as to sense the temperature of the circuit to be protected. As discussed herein, the temperature measurement unit 21 has the characteristic of changing its conductivity with the temperature change of the environment (i.e., conductivity reflects the change of resistance value). Based on the characteristics of the temperature-sensitive electronic components disposed in the temperature measurement unit 21, the measurement signal Vdec outputted by the temperature measurement unit 21 may have the characteristic of monotonically changing with linear changes of the temperature, or surge characteristic at a certain temperature. To this end, the measurement signal Vdec outputted by the temperature measurement unit 21 reflects a change in temperature or a certain specific temperature.

Figure 31:
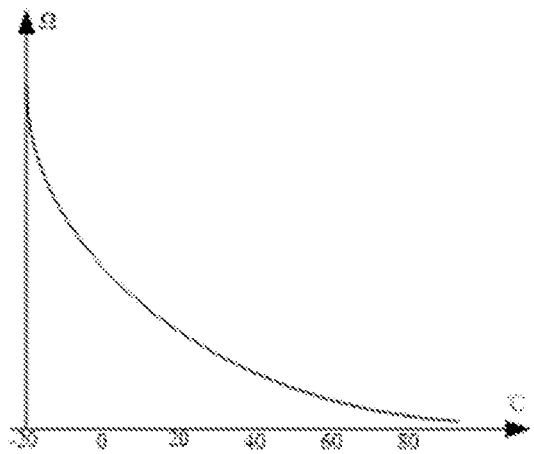
FIG. 31 depicts a schematic curve diagram of a resistance value of a thermistor changing with temperature.

Taking the monotonicity between the resistance value change of the temperature measurement unit 21 and the ambient temperature change as an example, the monotonicity indicates that the relationship between the resistance value change and the environmental temperature change is in the same direction or reverse direction. The monotonicity can be monotonicity based on a linear relationship, or monotonicity based on a non-linear relationship. For example, the change in the resistance value of the temperature measurement unit 21 and the change in the ambient temperature may have a proportional relationship with coefficient K. As another example, please refer to FIG. 31, which depicts a schematic diagram of a thermistor resistance changing with temperature. The resistance value change of the temperature measurement unit 21 and the change of the ambient temperature are non-linear, and when the ambient temperature is in a different interval, the level of change of the resistance value of the temperature measurement unit 21 corresponding the temperature is different. When the ambient temperature is low (e.g., below −10° C., as shown in FIG. 31), the resistance value of the temperature measurement unit 21 changes with temperature more significantly. When the ambient temperature is in a normal range (e.g., between 30° C. and 60° C., as shown in FIG. 31), or high (e.g., above 70° C., as shown in FIG. 31), the resistance value of the temperature measurement unit 21 does not change as significantly with temperature. In addition, in an illustrated example, the relationship between the resistance value change of the temperature measurement unit 21 and the ambient temperature change is in the same direction, for example, as the ambient temperature increases, the resistance increases, or as the ambient temperature decreases, the resistance value decreases. In another example, the relationship between the resistance value change of the temperature measurement unit 21 and the ambient temperature change is reversed, for example, as the ambient temperature increases, the resistance value decreases, or as the ambient temperature decreases, the resistance increases.

It should be noted that the above-mentioned monotonicity is not necessarily applicable or measurable in all temperature ranges. For example, when the ambient temperature of the LED lamp bead changes in the range from a room temperature to a certain threshold temperature, the change in the resistance value of the temperature measurement unit 21 can be ignored, or the temperature measurement unit 21 is used as a circuit structure with a fixed resistance value. When the ambient temperature of the LED lamp beads reaches a certain temperature range above the corresponding threshold temperature, the characteristic presented by the temperature measurement unit 21 that the resistance value changes monotonically with temperature changes makes the measurement become easier. The above-mentioned circuit characteristic regarding monotonicity existing between the change in resistance value and the change in ambient temperature can be viewed as the circuit characteristic exhibited at least during the normal operation of the temperature protection circuit.

Figure 2:
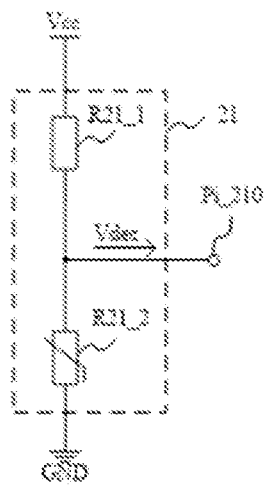
FIG. 2 depicts a schematic circuit structure diagram of a temperature measurement unit of the temperature sampling device in accordance with an embodiment of the present disclosure.

Please refer to FIG. 2, which depicts a schematic circuit structure diagram of a temperature measurement unit of a temperature sampling device in accordance with an embodiment of the present disclosure. As shown in the figure, the temperature measurement unit 21 includes a thermistor R21_2 and a voltage divider resistor R21_1 connected in series. One end of the thermistor R21_2 is coupled to the measurement end Pi_210, and the other end is grounded to GND. One end of the voltage divider resistor R21_1 is coupled to the power supply VCC, and the other end is coupled to one end of the thermistor R21_2.

In an illustrated example, the thermistor R21_2 is a Negative Temperature Coefficient (NTC) thermistor. Based on the circuit structure shown in FIG. 2, the working principle of the temperature measurement unit 21 is: when the ambient temperature rises, the resistance value of thermistor R21_2 is reduced in response to the increase in the ambient temperature. The measurement signal Vdec on the measurement end Pi_210 is the divided voltage of the power supply VCC obtained from the thermistor R21_2. Due to the decrease in the resistance value of the thermistor R21_2, the measurement signal Vdec decreases. Correspondingly, when the ambient temperature decreases, the measurement signal Vdec increases. In another illustrated example, the thermistor R21_2 is a positive temperature coefficient (PTC). Based on the circuit structure shown in FIG. 2, the working principle of the temperature measurement unit 21 is: when the ambient temperature rises, the resistance value of the thermistor R21_2 increases due to the increase in the ambient temperature. The measurement signal Vdec on the measurement end Pi_210 is the divided voltage of the power supply Vcc obtained from the thermistor R21_2. Due to the increase in the resistance value of the thermistor R21_2, the measurement signal Vdec increases. Correspondingly, when the ambient temperature decreases, the measurement signal Vdec decreases.

Figure 3:
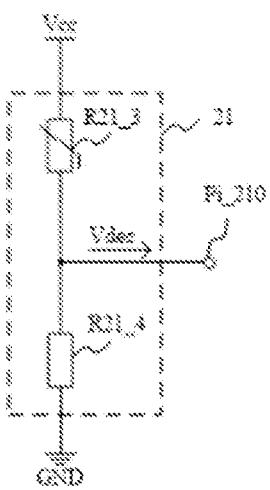
FIG. 3 depicts a schematic circuit structure diagram of a temperature measurement unit of the temperature sampling device in accordance with another embodiment of the present disclosure.

Please refer to FIG. 3, which depicts a schematic circuit structure diagram of a temperature measurement unit of the temperature sampling device in accordance with another embodiment of the present disclosure. As shown in the figure, the temperature measurement unit 21 includes a thermistor R21_3 and a voltage divider resistor R21_4 connected in series. One end of the thermistor R21_3 is coupled to the measurement end Pi_210, the other end is connected to the power supply Vcc. One end of the voltage divider resistor R21_4 is grounded to GND, and the other end is coupled to one end of the thermistor R21_3.

In an illustrated example, the thermistor R21_3 is a NTC thermistor. Based on the circuit structure shown in FIG. 3, the working principle of the temperature measurement unit 21 is: when the ambient temperature rises, the resistance value of the thermistor R21_3 is lowered. The measurement signal Vdec on the measurement end Pi_210 is the divided voltage of the power supply VCC obtained from the voltage divider R21_4. Due to the decrease of the total resistance value (i.e., the sum of the resistance values of the voltage divider resistor 214 and the thermistor R21_3), the divided voltage of the power supply Vcc obtained from the voltage dividing resistor R21_4 increases and so as the measurement signal Vdec. Correspondingly, when the ambient temperature decreases, the measurement signal Vdec decreases. In another illustrated example, the thermistor R21_3 is a PTC thermistor. Based on the circuit structure shown in FIG. 3, the working principle of the temperature measurement unit 21 is: when the ambient temperature rises, the resistance value of the thermistor R21_3 increases in response to the increase of the ambient temperature. The measurement signal Vdec on the measurement end Pi_210 is the divided voltage of the power supply Vcc obtained from the voltage divider resistor R21_4. Due to the increase of the total resistance value (i.e., the sum of the resistance value of the voltage divider resistor 214 and the thermistor R21_3), the divided voltage of the power supply Vcc obtained from the voltage dividing resistor R21_4 decreases, such that the measurement signal Vdec decreases. Correspondingly, when the ambient temperature decreases, the measurement signal Vdec increases.

As discussed above, the thermistor R21_2 or R21_3 in the temperature measurement unit 21 has the characteristic of changing the resistance value corresponding to the temperature change, such that the measurement signal Vdec changes monotonically with the change of the resistance value of the temperature measurement unit 21.

In order to prevent the condition that the following circuits lack of the ability to make response to temperature protection measures due to the rapid change and the excessive variation range of the measurement signal Vdec, in the embodiment shown in FIG. 1, the measurement end Pi_210 of the temperature measurement unit 21 is further coupled to a signal processing unit 22. The signal processing unit 22 is configured to limit the measurement signal Vdec in the temperature measurement unit 21 that is influenced by the change of the resistance, such that the temperature sampling signal Vtem corresponding to the change of the resistance value can be outputted under the condition of the measurement signal being limited. That is, within the same ambient temperature variation range, through limiting the variation range of the measurement signal Vdec by the signal processing unit 22, the signal magnitude variation range of the measurement signal Vdec can be reduced from the unrestricted range [a1,b1] to a restricted range [c1,d1]. If measured at the macro level, the limited signal magnitude variation range [c1, d1] can be viewed as basically unchanged. The limited signal magnitude variation range may not be easily measured, but the signal processing unit 22 is able to respond. The signal processing unit 22 performs signal processing on the limited measurement signal Vdec, such that the monotonicity still exists between the change of the temperature sampling signal Vtem outputted by the temperature sampling device and the change of the resistance value. As discussed herein, the monotonicity indicates that the relationship between the change of the resistance value of the temperature measurement unit 21 and the change of the temperature sampling signal Vtem is in the same direction or in the reverse direction. In an illustrated example, the relationship between the change of resistance value and the change of the temperature sampling signal Vtem is in the same direction. For example, as the resistance value increases, the temperature sampling signal Vtem increases, or as the resistance value decreases, the temperature sampling signal Vtem decreases. In another illustrated example, the relationship between the change of the resistance value and the change of the temperature sampling signal Vtem change is in a reverse direction. For example, as the resistance value increases, the temperature sampling signal Vtem decreases, or as the resistance value decreases, the temperature sampling signal Vtem increases.

Figure 4:
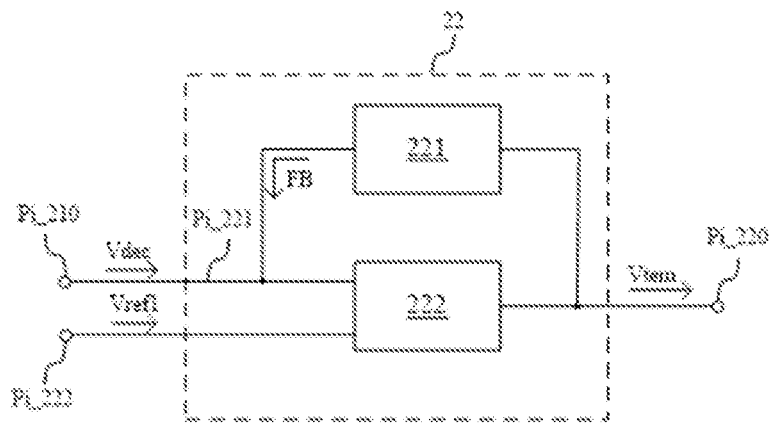
FIG. 4 depicts a schematic circuit block diagram of a signal processing unit of a temperature sampling device in accordance with an embodiment of the present disclosure.

Please refer to FIG. 4, which depicts a circuit block diagram of a signal processing unit of the temperature sampling device in accordance with an embodiment of the present disclosure. As shown in the figure, the signal processing unit 22 includes an amplifying module 222 and a feedback module 221. The amplifying module 222 has an input end Pi_221, a reference end Pi_222, and an output end Pi_220. The input end Pi_221 is coupled to the measurement end Pi_210 of the temperature measurement unit, a first reference signal Vref1 is fed into the reference end Pi_222, and the output end is the output end Pi_220 of the signal processing unit 22 that is configured to output the temperature sampling signal Vtem. The feedback module 221 is coupled between the output end Pi_220 and the measurement end Pi_210. The feedback module 221 feeds back a feedback signal FB generated based on the temperature sampling signal Vtem to the measurement end Pi_210 to limit the change of the measurement signal Vdec. The amplifying module 222 amplifies signals received from the input end Pi_221 based on the limited measurement signal Vdec, so as to output the temperature sampling signal Vtem. As discussed herein, the signal received from the input end Pi_221 can be, for example, a current signal generated based on the limited measurement signal Vdec, and the first reference signal Vref1 is a reference low electric potential, for example, the power ground GND or the reference ground SGND.

Specifically, the temperature sampling signal Vtem is generated after the measurement signal Vdec is limited by the feedback module 221, such that it can be determined that, the variation range of the resistance value of the temperature measurement unit 21 corresponds to the variation range of the signal magnitude of the preset temperature sampling signal. In some embodiments, the feedback module 221 can be, for example, a resistor (not shown). Here, the feedback signal FB generated by the feedback module 221 based on the temperature sampling signal Vdec is the current of the temperature sampling signal Vdec flowing through the resistor. Therefore, please refer to FIG. 7, which depicts a schematic diagram of a variation curve between the resistance value Rfb of the feedback module and the signal magnitude variation range of the temperature sampling signal Vtem. As shown in the figure, when the feedback module 221 is a resistor, the resistance value Rfb is related to the variation range of the preset temperature sampling signal Vtem corresponding to the variation range of the resistance value of the temperature measurement unit 21. Please refer to FIGS. 2, FIG. 3, and FIG. 4, taking the ambient temperature of the circuit to be protected being between 80° C. and 100° C., the thermistor R21_2 in the temperature measurement unit 21 is NTC (or the thermistor R21_3 is PTC), and the variation range of the resistance value of the thermistor R21_2 (or the thermistor R21_3) being between 12KΩ to 6.5KΩ as example, when the resistance value of the resistor of the feedback module 221 is 100KΩ, the preset variation range of the signal magnitude of the temperature sampling signal is 0.5V-7.2V; when the resistance value of the resistor of the feedback module 221 is 150KΩ, the preset variation range of the signal magnitude of the temperature sampling signal is 0.6V-8.5V; and when the resistance of the resistor of the feedback module 221 is 200KΩ, the preset variation range of the signal magnitude of the temperature sampling signal is 0.7V-9V. In other embodiments, the feedback module 221 further includes circuit structure including multiple resistive devices that are equivalent to a resistor. For example, the feedback module 221 includes multiple series/parallel connected resistors. In this case, the equivalent resistance value of the feedback module 221 is related to the signal magnitude variation range of the preset temperature sampling signal corresponding to the variation range of the resistance value of the temperature measurement unit 21.

Figure 5:
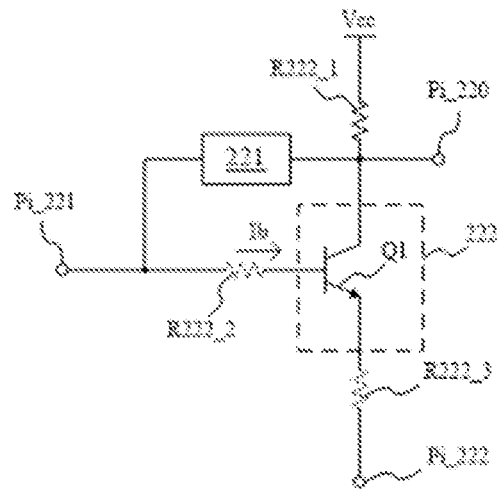
FIG. 5 depicts a schematic circuit structure diagram of a signal processing unit of a temperature sampling device in accordance with an embodiment of the present disclosure.

Please refer to FIG. 5, which depicts a schematic circuit structure diagram of a signal processing unit of a temperature sampling device in accordance with an embodiment of the present disclosure. As shown in the figure, the signal processing unit includes a feedback module 221, an amplification module 222, and a resistor R222_1. As discussed herein, one end of the feedback module 221 is coupled to the output end Pi_220 of the amplifying module 222, and the other end is coupled to the input end Pi_221. The amplifying module 222 includes a transistor Q1, the first end of the transistor Q1 is coupled to the output end Pi_220, the second end of the transistor Q1 is coupled to the reference end Pi_222, and the control end of the transistor Q1 is coupled to the input end Pi_221. In order to supply power to the amplifying module 222 and ensure that the temperature sampling signal Vtem can be outputted by the output end Pi_220 normally, the first end of the transistor Q1 is also coupled to a power supply Vcc through the resistor R222_1. It should be noted that a resistor R222_2 can also be coupled between the control end of the transistor Q1 and the input end Pi_221 of the amplifying module 222 to protect the transistor Q1 from a large current impact. A resistor R222_3 can also be coupled between the second end of the transistor Q1 and the reference end Pi_222 to stabilize the static operating point of the transistor Q1. In this case, since the resistor R222_2 and the resistor R222_3 are unnecessary components, the resistor R222_2 and the resistor R222_3 are shown in dashed lines in FIG. 5, and the resistance value of the resistor R222_3 is negligible in comparison with the resistor R222_1. In terms of the order of magnitude, the resistor R222_3 is of the level of ohmic, and the resistance R222_1 is of the level of kiloohm.

As described herein, the transistor Q1 can be NPN type or PNP type transistor. For example, when the thermistor R21_2 in the circuit structure of the temperature measurement unit 21 shown in FIG. 2 is NTC thermistor, or when the thermistor R21_3 in the circuit structure of the temperature measurement unit 21 shown in FIG. 3 is a PTC thermistor, the transistor Q1 shown in FIG. 5 is NPN type transistor. As another example, when the thermistor R21_2 in the circuit structure of the temperature measurement unit 21 shown in FIG. 2 is a PTC thermistor, or when the thermistor R21_3 in the circuit structure of the temperature measurement unit 21 shown in FIG. 3 is a NTC thermistor, the transistor Q1 can be PNP type transistor. It is understood that, when the PNP type transistor is used, the connecting relationship of the transistor Q1 in FIG. 5 needs to be adjusted adaptively based on the connecting characteristic of the PNP type transistor. In practical implementations, those skilled in the art is able to select model of the transistor Q1 based on the circuit architecture of the temperature measurement unit 21.

In the following example, the temperature measurement unit 21 is implemented by the circuit structure shown in FIG. 2 and the thermistor R21_2 is implemented by NTC thermistor, and the working process of the signal processing unit 22 is described with FIG. 5. When the temperature of the circuit to be protected increases, the resistance value of the thermistor R21_2 decreases, and the measurement signal Vdec decreases instantly, such that the control current Ib of the transistor Q1 decreases. Since the transistor Q1 is working in an amplified state (The reason why the transistor Q1 is in the amplified state will be described in detailed later), at this time, the temperature sampling signal Vtem outputted by the output end Pi_220 becomes larger (because Vtem=Vcc-β*Ib*R222_1). In order to prevent the measurement signal Vdec from changing too fast and the variation range of the measurement signal Vdec from being too large and the output temperature sampling signal Vtem cannot be limited to a certain preset range thereby, which makes it hard for the following circuit to respond to temperature protection measures, the feedback module 221 is coupled between the output end Pi_220 and the input end Pi_221 of the amplifying module 222 to limit the change of the measurement signal Vdec. Taking the feedback module 221 being a resistor as an example, the feedback module 221 takes the current of received temperature sampling signal Vdec flowing through the resistor as the feedback signal FB, and feeds the feedback signal FB back to the measurement end Pi_210 of the temperature measurement unit 21 through the input end Pi_221 of the amplifying module 222. As the temperature sampling signal Vtem becomes larger, the current as the feedback signal FB also increases, such that the current flowing through the thermistor R21_2 increases and the instant decrease of the aforementioned measurement signal Vdec is limited thereby. That is, in the above process, ignoring the control current Ib of the transistor Q1 (since the control current Ib is relatively small), the sum of the current flowing through the feedback module 221 and the current flowing through the resistor R21_1 of the temperature measurement unit 21 equals to the current flowing through the thermistor R21_2, the following equation is satisfied:

$$\frac{Vtem - Vdec}{R221} + \frac{Vcc - Vdec}{R21\_1} = \frac{Vdec}{R21\_2}$$

where R221 is the resistance of the feedback module 221. If the small variation of the measurement signal Vdec in the above-described process is ignored, then in the above-described process, as the resistance value of the thermistor R21_2 decreases (or increases), the temperature sampling signal Vtem also increases (or decreases) within the preset variation range.

The above discussion is only an illustrated example of using NTC thermistor as the thermistor R21_2 in the circuit architecture shown in FIG. 2. When the thermistor R21_2 is a PTC thermistor, the working principle of the signal processing unit 22 is similar to the above. The only difference is that, as the resistance value of the thermistor R21_2 decreases (or increases), the temperature sampling signal Vtem also decreases (or increases) within a preset variation range.

In addition, the temperature measurement unit 21 can also be implemented by the circuit structure shown in FIG. 3. At this time, the working principle of the signal processing unit 22 is similar to the above, except that, when the thermistor R21_3 is implemented by PTC thermistor, as the resistance value of the thermistor R21_3 decreases (or increases), the temperature sampling signal Vtem increases (or becomes smaller) within the preset variation range; and when the thermistor R21_3 is implemented by NTC thermistor, ss the resistance of the resistor R21_3 decreases (or increases), the temperature sampling signal Vtem decreases (or increases) within a preset variation range.

When the amplifying module 222 as shown in the embodiment of FIG. 5 is used to amplify the control current Ib, since the control current Ib is small, the temperature sampling signal Vtem outputted by the amplifying module 222 corresponding to the change of the resistance value of the temperature measurement unit 21 is not obvious due to insufficient amplification, which is adverse for the temperature protection device to capture or perform the corresponding temperature protection operation based on the signal magnitude of the temperature sampling signal. As a result, in another embodiment, in order to increase the amplification, the amplifying module in the signal processing unit includes at least two stages of cascaded transistors, the control end of the first transistor is coupled to the measurement end, and the last transistor is connected to the circuit between the reference end and the output end of the amplifying module.

Figure 6:
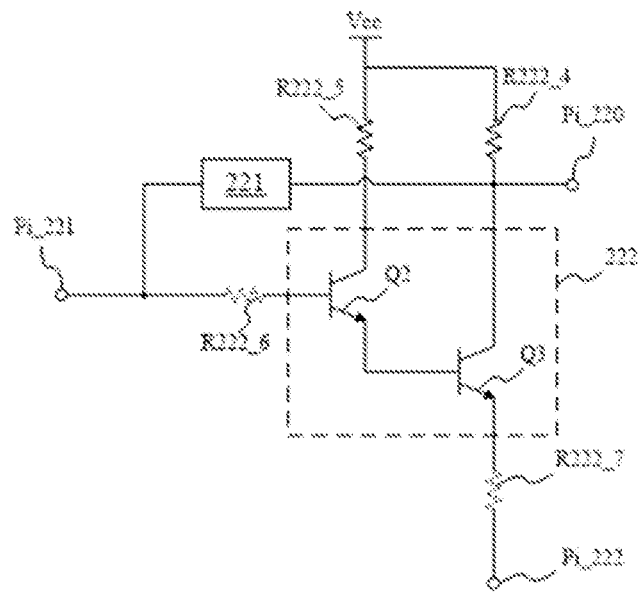
FIG. 6 depicts a schematic circuit structure diagram of a signal processing unit of a temperature sampling device in accordance with another embodiment of the present disclosure.
Figure 7:
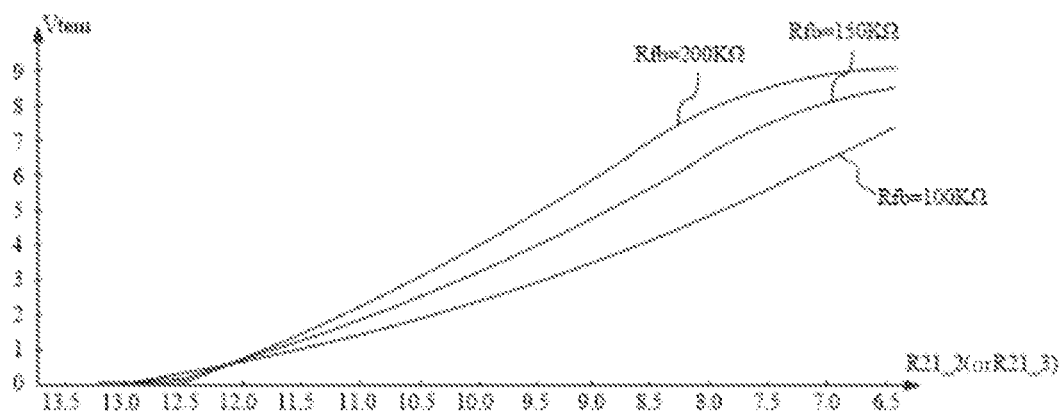
FIG. 7 is a schematic diagram depicting a variation curve between resistance value Rfb of a feedback module and signal magnitude variation range of a temperature sampling signal Vtem.

Please refer to FIG. 6, which depicts a schematic circuit structure diagram of a signal processing unit of a temperature sampling device in accordance with another embodiment of the present disclosure. As shown in the figure, the signal processing unit includes a feedback module 221, an amplification module 222, a resistor R222_4, and a resistor R222_5. In this case, one end of the feedback module 221 is coupled to the output end Pi_220 of the amplifying module 222, and the other end is coupled to the input end Pi_221. The amplifying module 222 includes two cascaded transistors Q2 and Q3, wherein the transistor Q2 is the first-stage transistor, and the transistor Q3 is the last-stage transistor. The first end of the transistor Q3 is coupled to the output end Pi_220 of the amplifying module 222, the second end of the transistor Q3 is coupled to the reference end Pi_222 of the amplifying module 222, and the transistor Q3 is coupled to the second end of the transistor Q2 through the control end of the transistor Q3. The control end of the transistor Q2 is coupled to the input end Pi_221 of the amplifying module 222 to supply power to the amplifying module 222 and enable the output end Pi_220 to normally output the temperature sampling signal Vtem. The first end of the transistor Q2 is coupled to the power supply Vcc through a resistor R222_5, and the first end of the transistor Q3 is also coupled to the power supply Vcc through the resistor R222_4. It should be noted that a resistor R222_6 can also be coupled between the control end of the transistor Q2 and the input end Pi_221 of the amplifying module 222 to protect the transistor Q2 from large current impact. A resistor R222_7 can also be coupled between the second end of the transistor Q3 and the reference end Pi_222 to stabilize the static operating point of the transistor Q3. As discussed herein, since the resistor R222_6 and the resistor R222_7 are unnecessary components, the resistor R222_6 and the resistor R222_7 are shown in dotted lines in FIG. 6. The resistance value of the resistor R222_7 is negligible in comparison with the resistor R222_4. In terms of order of magnitude, the resistor R222_7 is of the level of ohmic, and the resistance R222_4 is of the level of kiloohm.

In this example, the transistors Q2 and Q3 can be NPN type or PNP type transistor. For example, when the thermistor R21_2 in the circuit structure of the temperature measurement unit 21 shown in FIG. 2 is implemented by NTC thermistor, or when the thermistor R21_3 in the circuit structure of the temperature measurement unit 21 shown in FIG. 3, the transistors Q2 and Q3 shown in FIG. 6 are NPN type transistors. As another example, when the thermistor R21_2 in the circuit structure of the temperature measurement unit 21 shown in FIG. 2 is implemented by a PTC thermistor, or when the thermistor R21_3 in the circuit structure of the temperature measurement unit 21 shown in FIG. 3 is implemented by a NTC thermistor, the transistors Q2 and Q3 shown in FIG. 6 are PNP type transistors. It is understood that, when a PNP type transistor is used, the connecting relationship of the transistors Q2 and Q3 in FIG. 6 needs to be adjusted adaptively based on the connecting characteristic of the PNP type transistor. In practical implementations, those skilled in the art is able to select the models of the transistors Q2 and Q3 based on the circuit architecture of the temperature measurement unit 21.

The circuit structure of the two-stage transistors shown in FIG. 6 is only an illustrated example and is not a limitation on the number of stages of the amplifying module 222. In practical implementations, those skilled in the art can also appropriately increase the number of transistors between the transistor Q2 and the transistor Q3 based on requirements. In addition, the working principle of the signal processing unit shown in FIG. 6 is the same as the working principle of the signal processing unit including the signal processing unit shown in FIG. 5, the details are not repeated herein.

The above-discussed illustrated examples utilize the linear amplification region of the transistor to amplify the limited measurement signal Vdec. In some other examples, operational amplifiers can also be used to achieve the amplification. Those skilled in the art can adaptively adjust and connect the circuits based on the working principles of operational amplifiers, the details are not repeated herein.

Based on the description of each of the foregoing embodiments, the temperature sampling device achieves the purpose of converting the resistance value that changes with temperature into a corresponding temperature sampling signal within a preset signal magnitude range.

Combining the circuit structure of the temperature sampling devices provided in FIGS. 2 and 5, and the schematic curve diagram of a resistance value changing with temperature provided in FIG. 31, the thermistor R21_2 in the temperature measurement unit 21 is NTC, and the resistance value of thermistor R21_2 is higher when the ambient temperature of the thermistor R21_2 is low, which makes the voltage value of the measurement signal Vdec shown in FIG. 2 higher, and the transistor Q1 (NPN type) in the signal processing unit in a saturated state thereby. At this time, the transistor Q1 is completely turned on, the power supply Vcc flows into the reference end Pi_222 through the resistor R222_1, the transistor Q1, and the resistor R222_3. The output of the output end Pi_220 is zero or approximately zero, and the feedback module 221 of the signal processing unit 22 has no limitation effect on the measurement signal Vdec. When the ambient temperature of the circuit to be protected rises to an initial protection temperature, the measurement signal Vdec is reduced in response to the decrease of the resistance value of the thermistor R21_2 such that the transistor Q1 is in an amplified state (for example, the measurement signal Vdec is reduced to 0.6V). Beginning to work based on the working principle described in the foregoing embodiments, the feedback module 221 limits the measurement signal Vdec to, for example, around 0.6V, and the output end Pi_220 outputs the temperature sampling signal Vtem corresponding to the change of the resistance value of the thermistor R21_2. If the ambient temperature of the circuit to be protected continues to increase, the resistance value of the thermistor R21_2 continues to decrease, and the measurement signal Vdec continues to decrease as well, so that the transistor Q1 is in the off state and the temperature sampling signal Vtem does not change with the change of the resistance value.

It should be noted that the change of the resistance value of the thermistor R21_2 or R21_3 with the temperature is related to type and performance of the resistor. If the thermistor R21_2 or R21_3 is PTC type thermistor, the corresponding curve of resistance value change with temperature is opposite to FIG. 31, That is, the resistance value of the PTC type thermistor increases with the increase of temperature. For reference, since the signal processing unit 22 includes semiconductor device with three states as above described, the semiconductor device would also switch between the three states base on the change of the received electrical signal. This enables the temperature sampling device to provide temperature sampling signals when the circuit to be protected needs temperature protection. Taking the circuit structure of FIG. 2 and FIG. 5 as an example still, the thermistor R21_2 is a PTC thermistor, and the transistor Q1 is a PNP type transistor. When the ambient temperature of the circuit to be protected is low, the resistance value of the thermistor R21_2 is smaller, the measurement signal Vdec is also smaller, so that the transistor Q1 is in a saturated state and is completely turned on, the output of the output end Pi_220 is zero or approximately zero, and the signal processing unit 22 is in the first state. When the ambient temperature of the circuit to be protected rises to the initial protection temperature, the measurement signal Vdec also rises in response to the rise of the thermistor R21_2, such that the transistor Q1 is in an amplified state and the signal processing unit 22 enters the second state. In addition, the temperature measurement unit 21 can also be implemented by the circuit architecture shown in FIG. 3, at this time, the working principle of the signal processing unit 22 is similar to the above, and details are not repeated herein.

The working process of the signal processing unit 22 shown in FIG. 6 changing from the first state to the second state is similar to the working process of the circuit architecture shown in FIG. 5 that changes from the first state to the second state correspondingly. Except that, when the ambient temperature of the circuit to be protected rises to the initial protection temperature, since the amplifying module 222 shown in FIG. 6 includes two cascaded transistors Q2 and Q3, the value of the measurement signal Vdec that makes the transistors Q2 and Q3 of FIG. 6 switch from the saturated state to the amplified state is different from that in the embodiment shown in FIG. 5. For example, in FIG. 6, the measurement signal Vdec is reduced to 1.2V so that the transistors Q2 and Q3 are in an amplified state, and the signal processing unit 22 enters the second state. The feedback module 221 in FIG. 6 limits the measurement signal Vdec to around 1.2V, and the output end Pi_220 outputs the temperature sampling signal Vtem corresponding to the resistance value change of the temperature measurement unit 21.

Taking the circuit to be protected being a LED lamp as an example, when the LED lamp is working within the normal operating temperature range, the temperature sampling signal outputted by the temperature sampling device would not trigger the subsequent temperature protection operation of the temperature protection device, such as the signal type, signal value, etc. of the temperature sampling signal does not trigger the temperature protection operation; or, the temperature sampling device would not output the temperature sampling signal and the temperature protection operation would not be triggered. When the ambient temperature reaches the initial protection temperature (e.g., 80° C.), the temperature sampling device outputs a temperature sampling signal that reflects the temperature change. That is, the signal processing unit 22 in each above-discussed embodiment is transferred from the first state to the second state based on the change in the measurement signal when the ambient temperature of the circuit to be protected rises to the initial protection temperature. During the time period in the second state, the signal processing unit 22 generates the temperature sampling signal Vtem. As discussed herein, the first state is a state in which the signal processing unit 22 has not been activated, or a state in which a valid output is not provided based on the off state/on state of the semiconductor device in the signal processing unit 22; and the second state is the state in which the signal processing unit 22 is activated, or the state in which the semiconductor device in the signal processing unit 22 is in a linearly amplified state and is in a state to provide valid output.

Figure 8:
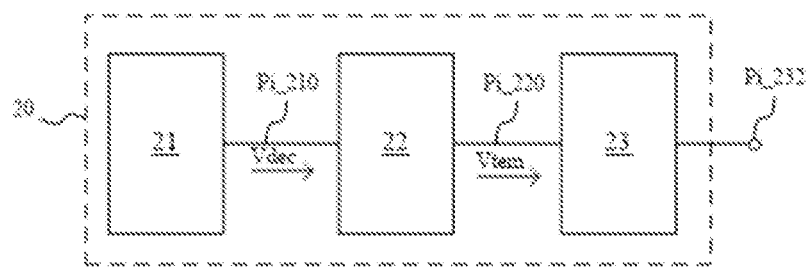
FIG. 8 depicts a schematic circuit block diagram of a temperature sampling device in accordance with another embodiment of the present disclosure.

Please refer to FIG. 8, which depicts a schematic circuit block diagram of a temperature sampling device in accordance with another embodiment of the present disclosure. On the basis of FIG. 1, the temperature sampling device 20 further includes an output unit 23. The output unit 23 is coupled to the output end Pi_220 of the signal processing unit 22 to outputs the received temperature sampling signal Vtem.

Here, the output unit 23 can be configured to isolating signals between the temperature sampling device and the subsequent circuit and can include circuit structure with an isolation function such as a capacitor or a transistor.

In some embodiments, the output unit 23 includes a voltage follower module (not shown), the input end of the output unit 23 is coupled to the output end of the signal processing unit, the reference end of the output unit 23 receives the second reference signal, and the output end of the voltage follower module outputs the temperature sampling signal Vtem.

Figure 9:
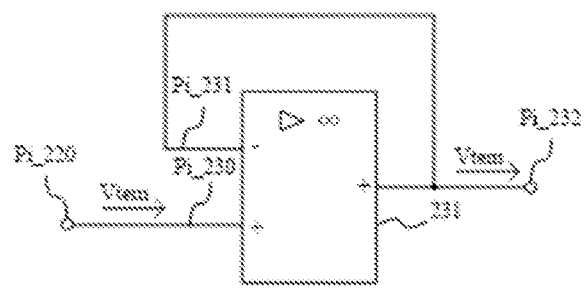
FIG. 9 depicts a schematic circuit structure diagram of a voltage follower module of the temperature sampling device in accordance with an embodiment of the present disclosure.

Please refer to FIG. 9, which depicts schematic circuit block diagram of a temperature sampling device in accordance with another embodiment of the present disclosure. As shown in the figure, the voltage follower module includes a voltage follower 231. The first input end of the voltage follower 231 is served as the input end Pi_230 of the voltage follower module and is coupled to the output end Pi_220 of the signal processing unit 22. The second input end of the voltage follower 231 is served as the reference end Pi_231 of the voltage follower module and is coupled to the output end of the voltage follower 231 such that the output of the voltage follower 231 can be taken as the second reference signal. The output end of the voltage follower 231 is served as the as the output end Pi_232 of the voltage follower module.

Since the voltage follower module shown in FIG. 9 is implemented by a voltage follower 231, the amplification factor of the voltage follower 231 is 1 or close to 1. As a result, the output of the voltage follower module on the output end Pi_232 follows the temperature sampling signal Vtem received from the input end Pi_230. That is, the output on the output end Pi_232 is the same with or similar to the temperature sampling signal Vtem received from the input end Pi_230 of the voltage follower module. Therefore, it can be regarded as the voltage follower module shown in FIG. 9 outputs the temperature sampling signal Vtem.

Figure 10:
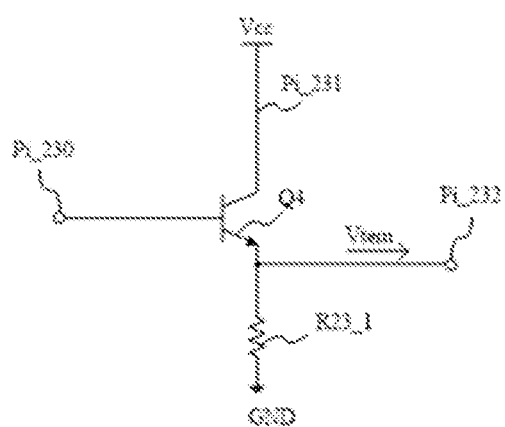
FIG. 10 depicts a schematic circuit structure diagram of a voltage follower module of the temperature sampling device in accordance with another embodiment of the present disclosure.

Please refer to FIG. 10, which depicts a schematic circuit structure diagram of a voltage follower module of the temperature sampling device in accordance with another embodiment of the present disclosure. As shown in the figure, the voltage follower module includes a transistor Q4. The control end of the transistor Q4 is coupled to the input end Pi_230 of the follower module. The first end of the transistor Q4 is coupled to the reference end Pi_231 of the voltage follower module to receive the power source Vcc as the second reference signal to supply power to the transistor Q4. The second end of the transistor Q4 is connected to a reference low electric potential through a resistor R23_1 (the reference low electric potential can be the power ground GND or reference ground SGND, shown as the power ground GND in FIG. 10). Meanwhile, the second end of the transistor Q4 is coupled to the output end Pi_232 of the voltage follower module to output the temperature sampling signal Vtem.

Specifically, the transistor Q4 receives at the control end of the transistor Q4 the temperature sampling signal Vtem inputted from the input end Pi_230 of the voltage follower module. The temperature sampling signal Vtem would cause the transistor Q4 to enter an amplified state. At this time, the PN junction between the control end and the second end of the transistor Q4 is already in the conducting state, and the voltage drop of the PN junction basically remains unchanged after the PN junction is conducting. In this way, when the temperature sampling signal Vtem at the control end increases, the signal outputted from the second end also increases, and when the temperature sampling signal Vtem at the control end decreases, the signal outputted from the second end also decreases. Obviously, the signal at the second end changes with the change of temperature sampling signal Vtem, so the temperature sampling signal Vtem is outputted at the output end Pi_232 of the voltage follower module.

Figure 11:
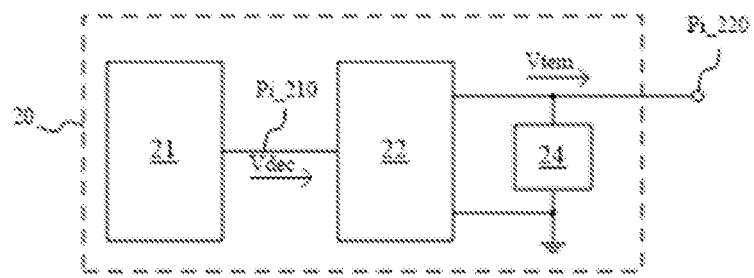
FIG. 11 depicts a schematic circuit block diagram of a temperature sampling device in accordance with another embodiment of the present disclosure.

Please refer to FIG. 11, which depicts a schematic circuit block diagram of a temperature sampling device in accordance with another embodiment of the present disclosure. As shown in the figure, on the basis of FIG. 1, the temperature sampling device further includes a filter unit 24, which is coupled to the output end Pi_220 of the signal processing unit 22 and is configured to filter the temperature sampling signal Vtem so as to remove noise of the temperature sampling signal Vtem. In this case, the filter unit 24 can be, for example, a filter capacitor (not shown). One end of the filter capacitor is coupled to the output end Pi_220 of the signal processing unit 22, and the other end is coupled to a reference low electric potential. The reference low electric potential can be the power ground GND or the reference ground SGND, which is shown as the power ground GND in the figure.

Figure 12A:
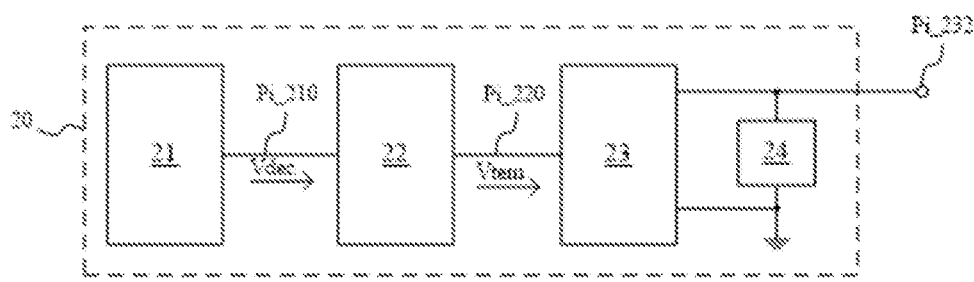
FIG. 12A depicts a schematic circuit block diagram of a temperature sampling device in accordance with another embodiment of the present disclosure.

Please refer to FIG. 12A, which shows a schematic circuit block diagram of the temperature sampling device of this application in another embodiment. As shown in the figure, on the basis of FIG. 10, the temperature sampling device further includes a filter unit 24, coupled to the output end Pi_232 of the output unit 23 and is configured to filter the temperature sampling signal Vtem outputted by the output unit 23 to remove the noise of the temperature sampling signal Vtem. As discussed herein, the filter unit 24 can be, for example, a filter capacitor (not shown). One end of the filter capacitor is coupled to the output end Pi_232 of the output unit 23, and the other end is coupled to a reference low electric potential. The reference low electric potential can be power ground GND or reference ground SGND, which is shown as power ground GND in the figure.

The temperature sampling signal Vtem outputted by the temperature sampling device described in the above-discussed embodiments is configured to be transmitted to the temperature protection device, such that the temperature protection device can cool down the circuit to be protected in response to the temperature sampling signal Vtem. For example, the temperature protection device can be a cooling fan, which is activated based on the temperature sampling signal Vtem to dissipate heat from the circuit to be protected. As another example, the temperature protection device is a driving module in the power supply, and the driving module adjusts the output power thereof based on the magnitude of the temperature sampling signal Vtem to reduce heat generation, so as to ensure the normal operation of the circuit to be protected. However, the above-mentioned is not limited thereto. The temperature protection device can be any device that can adjust the ambient temperature of the circuit to be protected based on the temperature sampling signal Vtem.

The temperature sampling device provided in the above-discussed embodiments senses the ambient temperature of the circuit to be protected through a thermistor, which is low in cost. In addition, the temperature sampling device can be directly coupled to the temperature protection device, no additional circuit is required, there is no need to change the internal structure of the existing temperature protection device, so strong versatility is possessed.

In other embodiments, the switching power supply can be referred to as power supply module, the LED load circuit can be referred to as LED module, the temperature sampling device can be referred to as a temperature protection circuit, and the temperature sampling signal Vtem can be referred to as a temperature protection signal Vtem, and the negative temperature coefficient thermistor can be abbreviated as NTC thermistor.

Figure 12B:
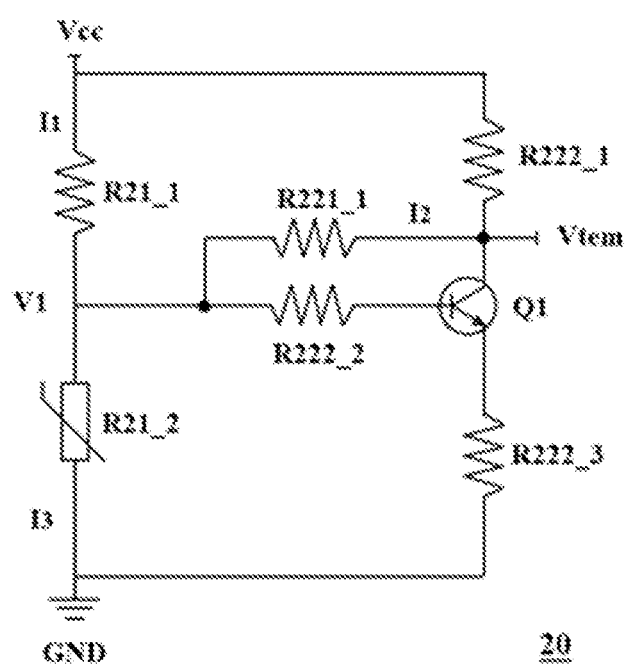
FIG. 12B depicts a schematic circuit structure diagram of a temperature protection circuit in accordance with an embodiment of the present disclosure.

FIG. 12B depicts a schematic circuit structure diagram of a temperature protection circuit in accordance with an embodiment of the present disclosure. The temperature protection circuit 20 includes resistors R21_1, R221_1, R222_1, R222_2, and R222_3, transistors Q1 and NTC thermistor R21_2. The first pin of the resistor R21_1 is electrically connected to the first pin of the resistor R222_1, and the second pin of the resistor R21_1 is electrically connected to the first pin of the NTC thermistor R21_2. The first pin of the resistor R221_1 and the first pin of the resistor R222_2 are electrically connected to the second pin of the resistor R21_1. The second pin of the resistor R222_1 is electrically connected to the second pin of the resistor R221_1. The base (b pole) of the transistor Q1 is electrically connected to the second pin of the resistor R222_2, the collector (c pole) of the transistor Q1 is electrically connected to the second pin of the resistor R221_1, and the emitter (e pole) of the transistor Q1 is electrically connected to the first pin of resistor R222_3. The second pin of the resistor R222_3 is electrically connected to the second pin of the NTC thermistor R21_2 and is electrically connected to the circuit node GND. The first pin of the resistor R21_1 is electrically connected to the input end of the temperature protection circuit for receiving the voltage input signal Vcc, and the collector (c pole) of the transistor Q1 is electrically connected to the output end of the temperature protection circuit for outputting temperature protection signal Vtem.

In this embodiment, NTC thermistor R21_2 is a negative temperature coefficient thermistor, which has different resistance values at different temperatures, and when the temperature is higher, the resistance value is smaller.

The operation principle of the temperature protection circuit 20 would be described below. The NTC thermistor R21_2 is configured to sense temperature and convert the temperature change into the change of the resistance value thereof. The change of the resistance value of NTC thermistor R21_2 is reflected in the circuit and would have influence on the output temperature protection signal Vtem. Since the b-pole input impedance of the transistor Q1 is relatively large, similar to the circuit principle of an operational amplifier, the b-pole of the transistor Q1 can be equivalent to a virtually open, and the voltage V1 at the first pin of the resistor R21_1 is approximately equal to the turn-on voltage Von of the transistor Q1, the relationship of the current in the circuit satisfies the following relationship:

$$I1+I2=I3 \qquad \text{Equation 1}$$

That is, the current I1 flowing through the resistor R21_1 plus the current I2 flowing through the resistor R221_1 is equal to the current I3 flowing through the NTC thermistor R21_2.

Substituting the voltage and resistance of each node in the circuit into Equation 1, the following equation can be obtained:

$$\frac{Vcc - V1}{R21\_1} + \frac{Vtem - V1}{R221\_1} = \frac{V1}{R21\_2} \qquad \text{Equation 2}$$

In this equation, R21_1 is the resistance value of resistor R21_1, R221_1 is the resistance value of resistor R221_1, R21_2 is the resistance value of NTC thermistor R21_2, Vtem is the temperature protection signal, Vcc is the input voltage signal of the temperature protection circuit 20, and V1 is node voltage of the second pin of the resistor R21_1. The value of V1 is equal to the turn-on voltage of transistor Q1, which is around 0.6V.

Through the above equation, the relationship between the temperature protection signal Vtem and the resistance value of NTC thermistor R21_2 can be obtained.

Figure 12C:
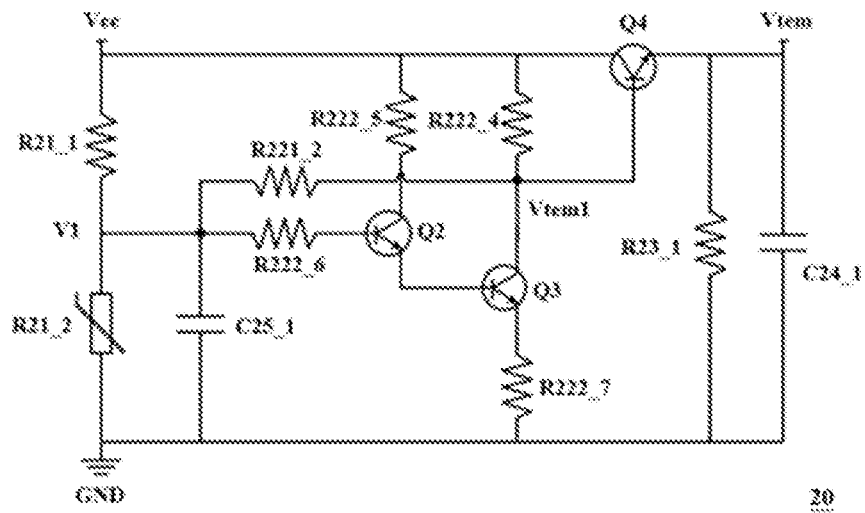
FIG. 12C depicts a schematic circuit structure diagram of a temperature protection circuit in accordance with another embodiment of the present disclosure.
Figure 12D:
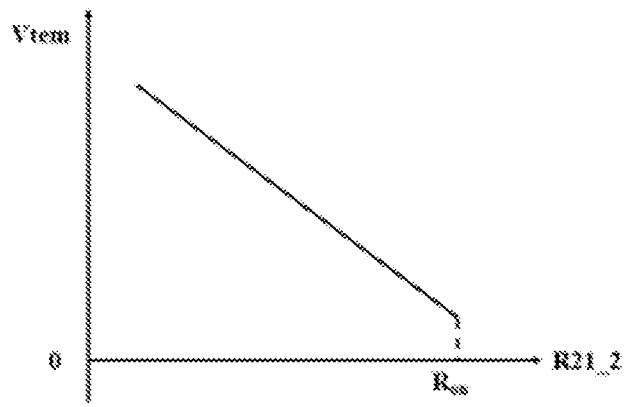
FIG. 12D depicts a schematic diagram of a relationship curve between the temperature protection signal Vtem and resistance value of thermistor $R_{NTC}$ in accordance with an embodiment of the present disclosure.

Referring to FIG. 12D, it depicts a schematic diagram of a relationship curve between the temperature protection signal Vtem and resistance value of thermistor $R_{NTC}$ in accordance with an embodiment of the present disclosure. In the figure, the x-axis is the resistance value of NTC thermistor R21_2, and the y-axis is the temperature protection signal Vtem. It can be seen from the figure that when the resistance value of NTC thermistor increases, the temperature protection signal Vtem decreases.

The resistor R21_1 is configured to set the initial temperature at which the temperature protection circuit 20 starts to output the temperature protection signal Vtem.

The resistance value of resistor R21_1 and NTC satisfies the following equation:

$$Vin * R_{ON}/(R21\_1 + R_{ON}) \approx Von \qquad \text{Equation 3}$$

In the equation, $R_{ON}$ is the resistance value of the NTC corresponding to the initial temperature, R21_1 is the resistance value of the resistor R21_1, Vcc is the input voltage, and Von is the turn-on voltage of the transistor Q1, which is approximately 0.6V.

By changing the resistance value of the resistor R21_1 in the equation 3, the initial temperature of the temperature protection circuit 20 that the temperature protection signal Vtem started to output can be set. When the operating temperature of the LED lamp is greater than the initial temperature, the temperature protection circuit 20 starts to output a temperature protection signal Vtem.

Through the disclosure of this embodiment, the temperature signal sensed by the NTC thermistor R 21_2 can be converted into its own resistance value, and then the temperature signal is converted into the corresponding temperature protection signal Vtem through the temperature protection circuit 20.

FIG. 12C a schematic circuit structure diagram of a temperature protection circuit in accordance with another embodiment of the present disclosure. The temperature protection circuit 20 includes resistors R21_1, R221_2, R222_5, R222_4, R222_6, R222_7, and R23_1, capacitors C25_1 and C24_1, transistors Q2, Q3 and Q4, and NTC thermistor R21_2. The first pin of the resistor R21_1 is electrically connected to the first pin of the resistor R222_5 and the first pin of the resistor R222_4. The first pin of NTC thermistor R21_2 is electrically connected to the second pin of the resistor R21_1, and the second pin of the NTC thermistor R21_2 is electrically connected to the circuit node GND. The first pin of the resistor R221_2 is electrically connected to the first pin of the resistor R222_6 and is electrically connected to the second pin of the resistor R21_1. The b pole of the transistor Q2 is electrically connected to the second pin of the resistor R222_6, and the c pole of the transistor Q2 is electrically connected to the second pin of the resistor R222_5. The b pole of the transistor Q3 is electrically connected to the e pole of the transistor Q2, the c pole of the transistor Q3 is electrically connected to the second pin of the resistor R222_4, and the e pole of the transistor Q3 is electrically connected to the first pin of the resistor R222_7. The second pin of the resistor R222_7 is electrically connected to the circuit node GND. The first pin of the capacitor C25_1 is electrically connected to the first pin of the resistor R221_2, and the second pin of the capacitor C25_1 is electrically connected to the circuit node GND. The b pole of the transistor Q4 is electrically connected to the second pin of the electronic R221_2 and the second pin of the resistor R222_4, the c pole of the transistor Q4 is electrically connected to the first pin of the resistor R21_1, and e pole of the transistor Q4 is electrically connected to the first pin of the resistor R23_1 and the first pin of the capacitor C24_1. The second pin of the resistor R23_1 is electrically connected to the second pin of the capacitor C24_1 and is electrically connected to the circuit node GND.

Vcc is the input voltage of the input end of the temperature protection circuit 20, Vtem is the temperature protection signal outputted by the temperature protection circuit 20, V1 is the node voltage at the second pin of the resistor R21_1, and Vtem1 is the node voltage at the second pin of the resistor R222_4.

Similar to the embodiment shown in FIG. 12B, the temperature protection circuit 20 of this embodiment is configured to sample the operating temperature of the LED lamp and convert the temperature signal into a temperature protection signal Vtem. The difference is that a transistor Q3 is added in this embodiment. The transistor Q2 and the transistor Q3 are configured to realize two-stage amplification and the stability of the circuit can be increased. The transistor Q4 and the resistor R23_1 form a voltage follower, and the temperature protection signal Vtem has a stronger driving capability than Vtem1. The capacitor C24_1 is configured to filter the temperature protection signal Vtem.

Similarly, the circuit node signal Vtem1 and the resistance value $R_{NTC}$ of the NTC thermistor R21_2 satisfies the following equation:

$$\frac{Vcc - V1}{R21\_1} + \frac{Vtem1 - V1}{R221\_2} = \frac{V1}{R21\_2} \quad \text{Equation 4}$$

In the equation, R21_1 is the resistance value of resistor R21_1, R221_2 is the resistance value of resistor R2212, R21_2 is the resistance value of NTC thermistor R21_2, Vtem1 is the node voltage at the second pin of resistor R222_4, and Vcc is the input voltage signal of the temperature protection circuit 20, and V1 is the voltage from the second pin of the resistor R21_1.

In this embodiment, V1 is the sum of the turn-on voltages of the transistor Q2 and the transistor Q3, which is around 1.2V. Vtem and Vtem1 are approximately equal.

The relationship between the temperature protection signal Vtem and the resistance value of NTC thermistor R21_2 can be obtained from the Equation 4.

The capacitor C25_1 is configured to realize the slow start of the LED light, that is, the LED light slowly lights up after being powered on. The time from power-on to the normal brightness of the LED light depends on the capacitance value of the capacitor C25_1. As discussed herein, the smaller the capacitance value of the capacitor C25_1, the faster the LED light starts.

In other embodiments, the NTC thermistor R21_2 can be replaced by the PTC thermistor. When the PTC thermistor is used, the temperature protection signal Vtem has a negative correlation with the sampling temperature of the thermistor, that is, the higher the sampling temperature, the smaller the temperature protection signal Vtem.

Figure 13:
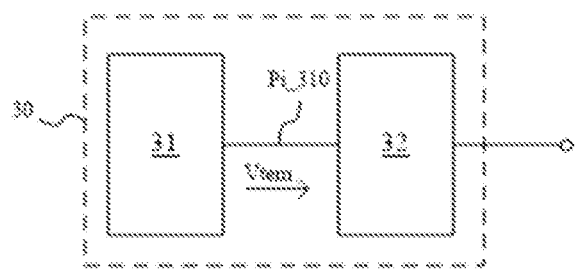
FIG. 13 depicts a schematic circuit block diagram of a temperature protection device in accordance with an embodiment of the present disclosure.

In possible implementations, this disclosure also provides a temperature protection device. Please refer to FIG. 13, which depicts a schematic circuit block diagram of a temperature protection device in accordance with an embodiment of the present disclosure. As shown in the figure, the temperature protection device 30 includes a temperature sampling device 31 and a temperature protection unit 32. The temperature sampling device 31 is configured to measure the ambient temperature of the circuit to be protected (not shown) and output a temperature sampling signal Vtem, so as to provide temperature protection operation corresponding to the change of the ambient temperature.

As discussed herein, the circuit to be protected refers to a circuit structure built by electronic components, which can change its own circuit characteristics under the influence of temperature, such as circuit life reduction, or damages to circuit functions. The electronic components include but are not limited to: basic components such as resistors, capacitors, and inductors, as well as semiconductor devices such as power transistors and integrated circuits.

Taking a switching power supply as an example, the switching power supply is used as a device for electrical energy conversion to convert AC power provided by the mains power into low-voltage DC power. Specifically, it can be, for example, a power adapter, a driver, or a driver chip for electronic equipment. The electronic components in the switching power supply may be degraded or lose efficiency due to heat. For example, the electrolyte in an electrolytic capacitor will dry up due to the high temperature, and the capacity of the electrolytic capacitor will decrease or disabled. Take an electrolytic capacitor with an operating temperature limit of 85° C. as an example, when it works at a temperature of 20° C., generally, 181019 hours a normal working time could be guaranteed, and when working at a limit temperature of 85° C., generally, only 2000 hours of normal working time could be guaranteed. As another example, voltage-current characteristic of a diode changes due to the influence of temperature. Taking a room temperature of 26° C. as a reference, when the forward current of the diode remains unchanged, for every 1° C. increases in temperature, the forward voltage drops by 2-2.5 mV. The reverse current would be doubled for every 10° C. increased in temperature. Yet another example, the insulation performance of inductors, transformers, chokes, etc. would decrease as the temperature rises. Taking a LED load circuit as an example, the LED load circuit includes a plurality of LED lamp beads. When the temperature of the LED lamp beads exceeds 100° C., the working lifetime of the LED lamp beads would be greatly reduced.

The whole temperature sampling device 31 is disposed in the vicinity of the circuit to be protected, or the thermosensitive component in the temperature measurement unit 21 is disposed in the vicinity of the circuit to be protected to sense the temperature of the circuit to be protected. The temperature sampling device 31 can be any one of the temperature sampling devices 20 described in the embodiments as shown in FIG. 1 to 12C. Please refer to the corresponding descriptions of FIGS. 1-12C for the circuit structure and working principle, which will not be repeated herein.

As discussed herein, the driving module is a device that converts an external input signal into an electrical signal suitable for load operation by controlling the conversion of electric energy, and the load can be various electronic devices and household appliances. In some embodiments, the driving module is implemented by a switching power supply, a driving control circuit, or a driving control chip, wherein the driving control circuit has a feedback pin to receive the temperature sampling signal Vtem. But not limited to this, the driving module can also be other circuit structures that is able to control the conversion of electrical energy. For example, the driving module can include any one of: a circuit structure based on the BUCK circuit architecture, a circuit structure based on the BOOST circuit architecture, a circuit structure based on the BOOST circuit architecture, or a circuit structure constructed by BOOST-BUCK circuit architecture.

Figure 14:
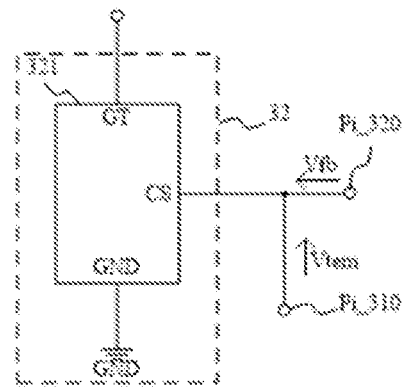
FIG. 14 depicts a schematic circuit structure diagram of a driving module of a temperature protection device in accordance with an embodiment of the present disclosure.

Please refer to FIG. 14, which depicts a schematic circuit structure diagram of a driving module of a temperature protection device in accordance with an embodiment of the present disclosure. As shown in the figure, the driving module includes a driving control circuit 321. The driving control circuit 321 has a feedback pin CS, an output pin GT, and a ground pin GND. The ground pin GND of the driving control circuit 321 is coupled to the power ground GND. On the one hand, the feedback pin CS is coupled to a load feedback end Pi_320 to receive the feedback signal Vfb that reflects the power supply of the load, and on the other hand, the feedback pin CS is coupled to the output end Pi_310 of the temperature sampling device 31 (the output end Pi_310 may correspond to output end Pi_220 in FIGS. 1-6, and 11, or output end Pi_232 in FIGS. 8-10, and 12A) to obtain the temperature sampling signal Vtem, and output pin GT of the driving control circuit 321 is configured to be coupled to a controlled circuit (not shown). The driving control circuit 321 outputs a control signal on the output pin GT of the driving control circuit 321 based on the feedback signal Vfb and the temperature sampling signal Vtem, such that the controlled circuit is able to reduces power of the load based on the control signal.

It should be noted that the temperature sampling signal Vtem is sent from the temperature sampling device 31, and the feedback signal Vfb reflects the power supply of the load, which comes from the controlled circuit. Therefore, the temperature sampling signal Vtem is different from the feedback signal Vfb. The controlled circuit is a circuit that is controlled by the driving control circuit 321 to provide power to the load. For example, the controlled circuit includes a switch circuit coupled to the output pin GT and a power converting circuit coupled to the switch circuit. As discussed herein, the switch circuit is controlled by the driving control circuit 321 to switch on and off to control the power conversion circuit to perform energy conversion, so that the power conversion circuit outputs a load power supply signal to supply power to the load.

Figure 15:
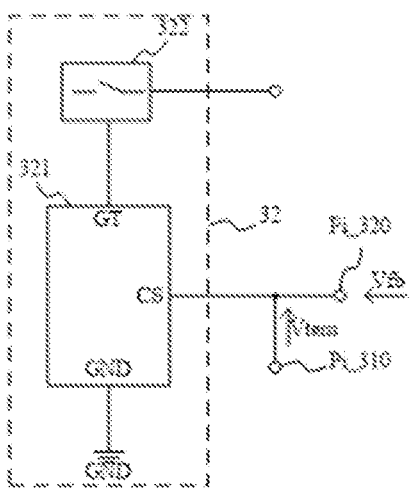
FIG. 15 depicts a schematic circuit structure diagram of a driving module of a temperature protection device in accordance with another embodiment of the present disclosure.

Further, the switch circuit can also be configured as a part of the driving module. Please refer to FIG. 15, which depicts a schematic circuit structure diagram of a driving module of a temperature protection device in accordance with another embodiment of the present disclosure. As shown in the figure, on the basis of FIG. 14, the driving module further includes a switch circuit 322. The switch circuit 322 is coupled to the output pin GT of the driving control circuit 321, such that the driving control circuit 321 outputs a sampling signal that changes based on the temperature sampling signal Vtem to the switch circuit 322 through the output pin GT of the driving control circuit 321. The switching circuit 322 adjusts one of switching frequency, on-time, or off-time thereof based on the control signal, such that the effect of load power adjustment can be achieved.

In this embodiment, the switch circuit 322 may include a switch, and the switch can be, for example, a metal-oxide-semiconductor field-effect transistor (MOSFET), a bipolar junction transistor (Bipolar Junction Transistor, BJT), triode, etc.

Furthermore, the power conversion circuit can also be included as one part of the driving module. Please refer to FIG. 16, which depicts a schematic circuit structure diagram of a driving module of a temperature protection device in accordance with another embodiment of the present disclosure. As shown in the figure, the driving module includes a driving control circuit 321, a switch circuit 322, and a power conversion circuit 323. The power conversion circuit 323 has a first pin Pi_321, a first output end Pi_322, and a second output end Pi_323, and receives an external power supply signal Vin (DC signal) through the first pin Pi_321 to perform energy conversion, so as to output a load power supply signal Vout at the first output end Pi_322 and the second output end Pi_323. The power conversion circuit 323 is coupled to the switch circuit 322. The switch circuit 322 is controlled by the driving control circuit 321.

As discussed herein, the power conversion circuit 323 includes an inductor L323_1, a freewheeling diode D323_1, and a capacitor C323_1. One end of the inductor L323_1 is connected to the second output end Pi_323, and the other end is coupled to the first end of the switch circuit 322. The capacitor C323_1 is coupled between the first output end Pi_322 and the second output end Pi_323 to stabilize the voltage difference between the first output end Pi_322 and the second output end Pi_323. The cathode of the freewheeling diode D323_1 is coupled to the first output end Pi_322, the anode is coupled to the first end of the switch circuit 322. The switch circuit 322 includes a switch Q5, which has a first end, a second end, and a control end. The first end of the switch Q5 is configured as the first end of the switch circuit 322 to be coupled to the other end of the inductor L323_1 of the power conversion circuit 323. The second end of the switch Q5 is connected to the power ground GND through a sampling resistor Rcs_1, and the control end of the switch Q5 is coupled to the output pin GT of the driving control circuit 321. It should be noted that the sampling resistor Rcs_1 disposed between the second end of the switch Q5 and the power ground GND is configured to form a current measurement circuit that converts the current flowing through the switch Q5 into a voltage value to generate the feedback signal Vfb. When the switch Q5 is turned on, the feedback signal Vfb on the current measurement circuit can be measured and transmitted to the driving control circuit 321 through the load feedback end Pi_320.

The driving control circuit 321 determines the on and off timing of the switch Q5 based on the temperature sampling signal Vtem and the feedback signal Vfb. When the driving control circuit 321 controls the switch Q5 to turn on, the external power supply signal Vin flows in through the first pin Pi_321, and flows out from the switch Q5 through the capacitor C323_1, the first output end Pi_322, the second output end Pi_323 and the inductor L323_1. At this time, the capacitor C323_1 and the inductor L323_1 perform energy storage. When the driving control circuit 321 controls the switch Q5 to turn off, the inductor L323_1 and the capacitor C323_1 release the stored energy, and the current flows through the freewheeling diode D323_1 to the first output end Pi_322, so as to output the load power supply signal Vout on the first output end Pi_322 and the second output end Pi_322. It should be noted that, in order to prevent the no-load operation of the driving module, in some embodiments, a resistor R323_1 is further connected in series between the first output end Pi_322 and the second output end Pi_323. Since the resistor R323_1 may be added or omitted depending on the actual implementation (i.e., non-essential components), so the resistor R323_1 is represented by dashed line in the figure.

Figure 16:
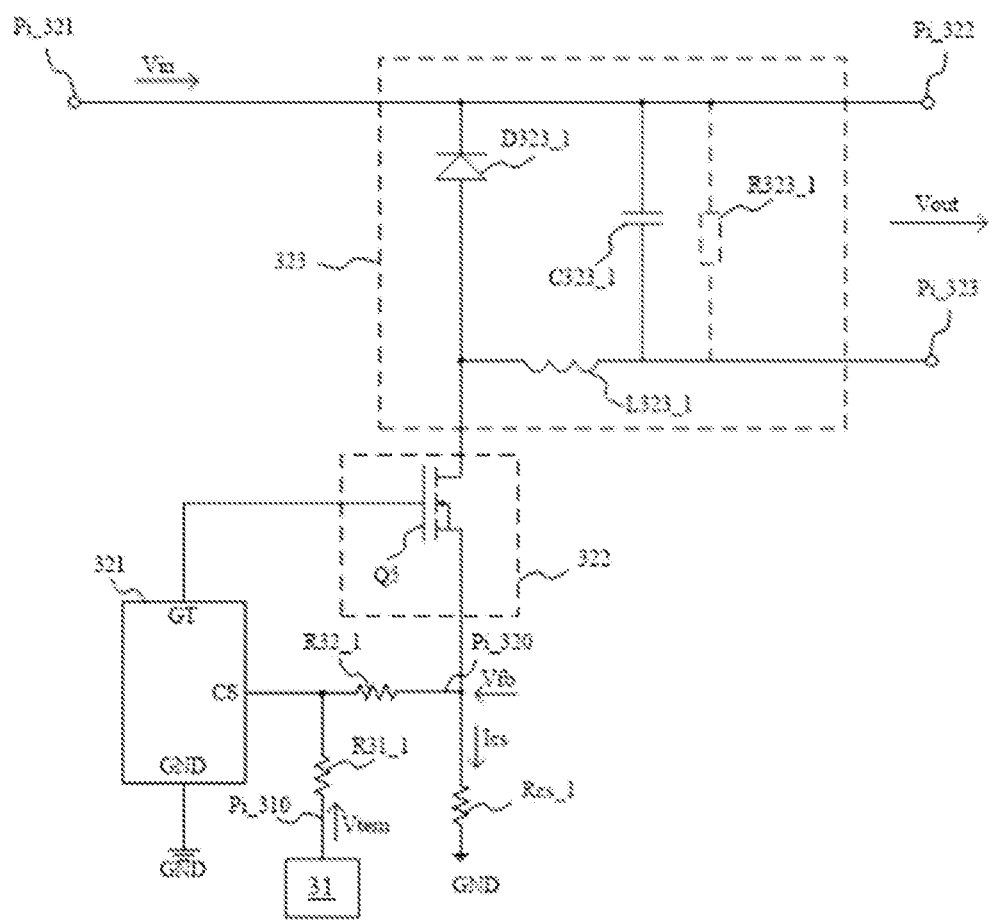
FIG. 16 depicts a schematic circuit structure diagram of a driving module of a temperature protection device in accordance with another embodiment of the present disclosure.

The following describes how the driving module performs the operation of reducing the output power to the load based on the temperature sampling signal with reference to FIG. 16. It should be noted in advance that, for ease of description, the temperature sampling device 31 is shown in FIG. 16, and in order to limit the current and facilitate the adjustment of the output power level of the driving module to the load, a resistor R31_1 is also coupled between the output end Pi_310 of the temperature sampling device 31 and the feedback pin CS of the driving control circuit 321, and a resistor R32_1 is coupled between the feedback pin CS of the driving control circuit 321 and the load feedback end Pi_320 (which is not shown in the following FIG. 17-19 since the figures are only used to describe the circuit structure of the driving module, however, in practical connection, the resistor R31_1 would be coupled between the output end Pi_310 of the temperature sampling device 31 and the feedback pin CS of the driving control circuit 321, and the resistor R32_1 would be coupled between the feedback pin CS of the driving control circuit 321 and the load feedback end Pi_320). The working principle of the driving control circuit 321 is based on the comparison between the reference voltage set by the reference end of the internal operational amplifier of the driving control circuit 321 and the voltage signal obtained on the feedback pin CS, and the on and off timing of the switch circuit 322 is adjusted based on the comparison result, so as to make the voltage signal obtained on the feedback pin CS equal to the internally set reference voltage eventually. Therefore, in the analysis, with the condition that the voltage signal (Vcs) obtained on the feedback pin CS is stabilized at the reference voltage, based on the "virtually short" characteristic of the operational amplifier inside of the driving control circuit 321, the current flowing through the resistor R31_1 is equal to the current flowing through the resistor R32_1, that is:

$$\frac{Vtem - Vcs}{R31\_1} = \frac{Vcs - Vfb}{R32\_1}$$

where Vfb=Ics*Rcs_1 is satisfied. As a result, when the temperature sampling signal Vtem is larger (that is, when the temperature of the circuit to be protected is too high), the driving control circuit 321 adjusts the on and off timing of the switch Q5 through the control signal outputted by the output pin GT, such that the current Ics flowing into the resistor Rcs_1 through the switch Q5 is reduced, that is, the current flowing through the load is reduced, and the output power to the load is reduced thereby. As discussed herein, the resistance values of the resistors R31_1 and R32_1 are referred as the fixed coefficients of the above analysis equation, which are related to the level of the output power to the load that the driving module is able to adjust. In other words, the resistance values of the resistor R31_1 and R32_1 relates to the performance of the temperature protection. Taking the temperature sampling signal Vtem outputting a fixed value corresponding to the temperature of the LED module sensed by the temperature sampling device as an example, (e.g., the LED module works at 80° C., the value of the temperature sampling signal Vtem outputted by the temperature sampling device corresponding to 80° C.), when the value of R32_1/R31_1 becomes larger, the driving module would reduce the power output to the load to a smaller value; and when the value of R32_1/R31_1 is smaller, the driving module would increase the power output to the load to a higher value. In practical implementations, those skilled in the art can select the parameters of the resistor R31_1 and R32_1 based on the temperature protection performance desired to be achieved in the actual situation.

It can also be described as, the working principle of the driving control circuit 321 is based on the comparison between the reference voltage Vref set at the reference end of the operational amplifier inside of the driving control circuit 321 and the voltage signal Vcs obtained on the feedback pin CS. When the voltage signal Vcs is greater than the reference voltage Vref, the driving control circuit 321 reduces the duty cycle of the switch Q5 through the control signal outputted at the pin GT, such that the current flowing through the load is reduced and power of the load is reduced thereby; and when the voltage signal Vcs is less than the reference voltage Vref, the driving control circuit 321 increases the duty cycle of the switch Q5 through the control signal outputted at the pin GT, such that the current flowing through the load increases and power of the load is increased.

In this implementation, the driving module can either work in a constant current mode and the output power is adjusted by adjusting the output current, or work in a constant voltage mode, and the output power is adjusted by adjusting the output voltage.

Figure 17:
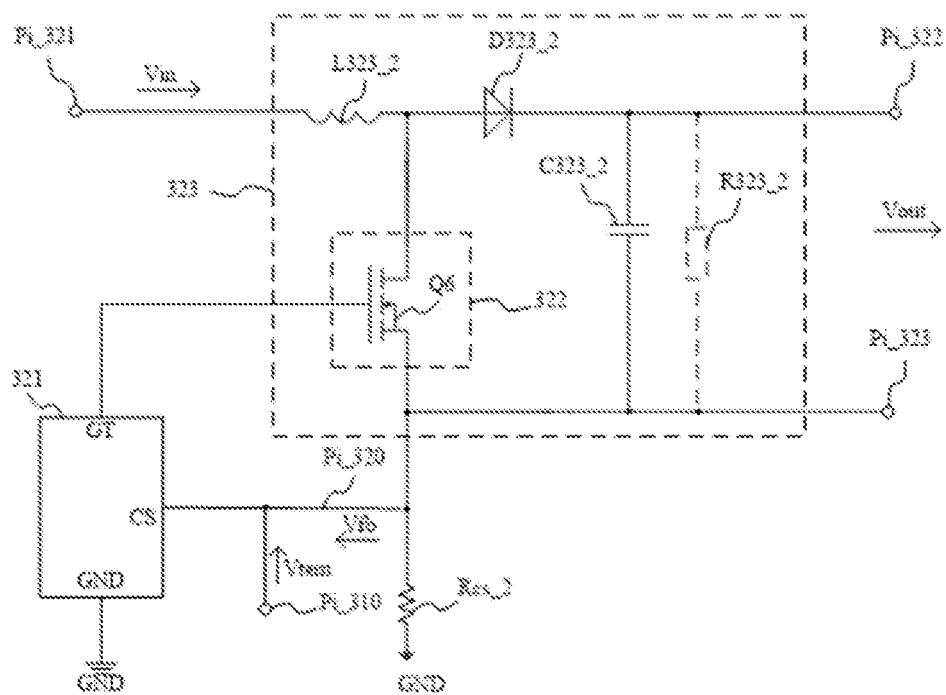
FIG. 17 depicts a schematic circuit structure diagram of a driving module of a temperature protection device in accordance with another embodiment of the present disclosure.

Please refer to FIG. 17, which depicts a schematic circuit structure diagram of a driving module of a temperature protection device in accordance with another embodiment of the present disclosure. As shown in the figure, the driving module includes a driving control circuit 321, a switch circuit 322, and a power conversion circuit 323. The power conversion circuit 323 has a first pin Pi_321, a first output end Pi_322, and a second output end Pi_323, and receives an external power supply signal Vin (DC signal) through the first pin Pi_321 of the power conversion circuit to perform energy conversion. The output end Pi_322 and the second output end Pi_323 output a load power supply signal Vout. The power conversion circuit 323 is coupled to the switch circuit 322. The switch circuit 322 is controlled by the driving control circuit 321.

As discussed herein, the power conversion circuit 323 includes an inductor L323_2, a freewheeling diode D323_2, and a capacitor C323_2. One end of the inductor L323_2 is connected to the first pin Pi_321, and the other end is coupled to the first end of the switch circuit 322. The capacitor C323_2 is coupled between the first output end Pi_322 and the second output end Pi_323 to stabilize the voltage difference between the first output end Pi_322 and the second output end Pi_323. The cathode of the freewheeling diode D323_2 is coupled to the first output end Pi_322, the anode is coupled to the first end of the switch circuit 322. The switch circuit 322 includes a switch Q6, which has a first end, a second end, and a control end. The first end of the switch Q6 is configured as the first end of the switch circuit 322 to be coupled to the other end the inductor L323_2 of the power conversion circuit 323. The second end of the switch Q6 is coupled to the second output end Pi_323 and is also connected to the power ground GND through a sampling resistor Rcs_2. The control end of the switch Q6 is coupled to the output pin GT of the driving control circuit 321. It should be noted that the sampling resistor Rcs_2 disposed between the second end of the switch Q6 and the power ground GND is configured to form a current measurement circuit, which converts the current flowing through the switch Q6 into a voltage value to generate the feedback signal Vfb. When the switch Q6 is turned on, the feedback signal Vfb on the current measurement circuit can be sampled and transmitted to the driving control circuit 321 through the load feedback end Pi_320. The switch circuit 322 in the figure only shows the connection relationship and the switch circuit 322 is not included in the power conversion circuit 323.

The driving control circuit 321 determines the on and off timing of the switch Q6 based on the temperature sampling signal Vtem and the feedback signal Vfb. When the driving control circuit 321 controls the switch Q6 to turn on, the external power supply signal Vin flows in from the first pin Pi_321 and flows out to the power ground GND through the inductor L323_2, the switch Q6, and the sampling resistor Rcs_2. At this time, as the current flowing through the inductor L323_2 increases with time, the inductor L323_2 is in the energy storage state, and at the same time, the capacitor C323_2 is in the energy release state. When the switch Q6 is turned off, the inductor 2203b is in a discharged state, and the current of the inductor L323_2 decreases with time. The current of the inductor L323_2 flows freely to the capacitor C323_2 and the first output end Pi_322 through the freewheeling diode D323_2. As a result, the load power supply signal Vout is outputted at the first output end Pi_322 and the second output end Pi_323. It should be noted that, in order to prevent the load from stably outputting the voltage during working in a no-load condition, in some embodiments, a resistor R323_2 is also connected in series between the first output end Pi_322 and the second output end Pi_323. Since the resistor R323_2 can be added or omitted (i.e., non-essential component) depending on the actual implementation, the resistor R323_2 is represented by dashed line in the figure.

Figure 18:
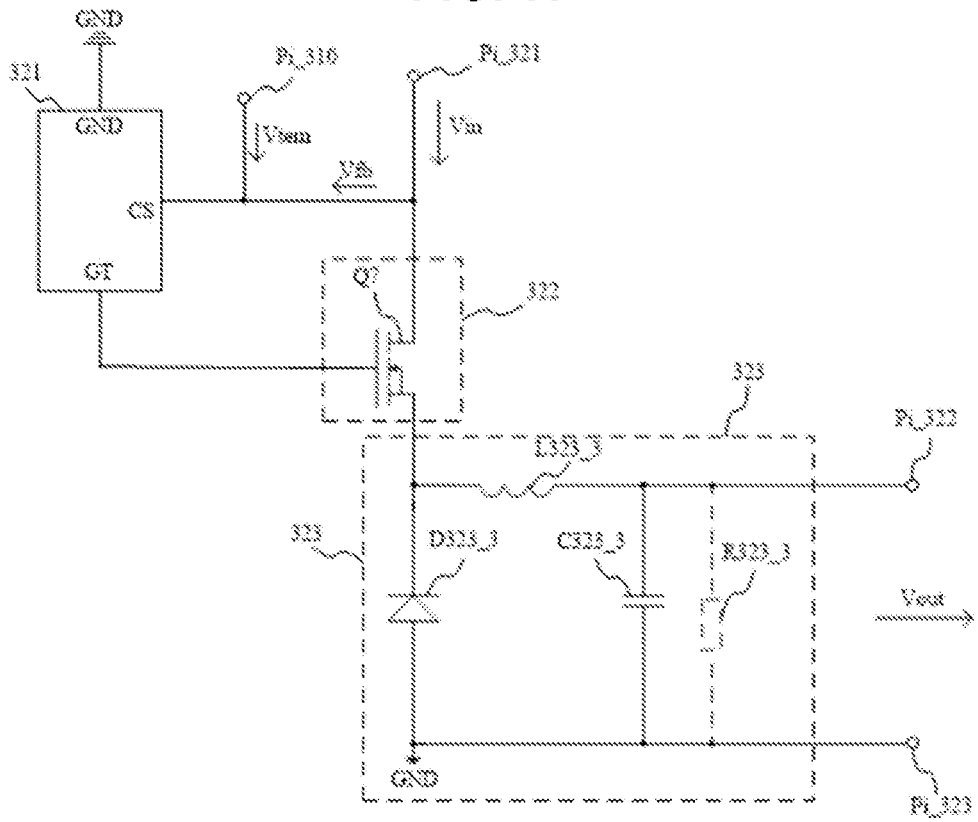
FIG. 18 depicts a schematic circuit structure diagram of a driving module of a temperature protection device in accordance with another embodiment of the present disclosure.

Please refer to FIG. 18, depicts a schematic circuit structure diagram of a driving module of a temperature protection device in accordance with another embodiment of the present disclosure. As shown in the figure, the driving module includes a driving control circuit 321, a switch circuit 322, and a power conversion circuit 323. The power conversion circuit 323 has a first pin Pi_321, a first output end Pi_322, and a second output end Pi_323, and receives an external power supply signal Vin (DC signal) through first pin Pi_321 of the power conversion circuit 323 to perform energy conversion, so as to output a load power supply signal Vout at the output end Pi_322 and the second output end Pi_323. The power conversion circuit 323 is coupled to the switch circuit 322. The switch circuit 322 is controlled by the driving control circuit 321.

As discussed herein, the power conversion circuit 323 includes an inductor L323_3, a freewheeling diode D323_3, and a capacitor C323_3. One end of the inductor L323_3 is connected to the first output end Pi_322, and the other end is coupled to the second end of the switch circuit 322. The capacitor C323_3 is coupled between the first output end Pi_322 and the second output end Pi_323 to stabilize the voltage difference between the first output end Pi_322 and the second output end Pi_323. The anode of the freewheeling diode D323_3 is coupled to the first output end Pi_322 and the power ground GND, and the cathode is coupled to the second end of the switch circuit 322. The switch circuit 322 includes a switch Q7, which has a first end, a second end, and a control end. The first end of the switch Q7 is configured as the first end of the switch circuit 322 to be coupled to the first pin Pi_321. The first end of the switch Q7 is also coupled to the feedback pin CS of the driving control circuit 321 through the load feedback end Pi_320, so that the current flowing through the switch Q7 is fed back to the driving control circuit 321 in the form of a feedback signal Vfb. The second end of the switch Q7 is configured as the second end of the switch circuit 322 to be coupled to the power conversion circuit 323, and the control end of the switch Q7 is coupled to the output pin GT of the driving control circuit 321.

The driving control circuit 321 determines the on and off timing of the switch Q7 based on the temperature sampling signal Vtem and the feedback signal Vfb. When the switch Q7 is turned on, the external power supply signal Vin flows in from the first end of the switch Q7, flows through the switch Q7, the inductor L323_3, the capacitor C323_3 and the first output end Pi_322 into the second output end Pi_323. At this time, the current flowing through the inductor L323_3, the voltage of the capacitor C323_3 increase with time, and the inductor L323_3 and the capacitor C323_3 are in an energy storage state. When the switch Q7 is turned off, the inductor L323_3 is in a discharged state, and the current of the inductor L323_3 decreases with time. At this time, the current of the inductor L323_3 returns to the inductor L323_3 through the first output end Pi_322, the second output end Pi_323, and the freewheeling diode D323_3 to generate a freewheeling current. As a result, the load power supply signal Vout is outputted at the first output end Pi_322 and the second output end Pi_323. It should be noted that, in order to prevent no-load operation of the driving module, in some embodiments, a resistor R323_3 is also connected in series between the first output end Pi_322 and the second output end Pi_323. Since the resistor R323_3 can be increased or omitted depending on actual implementing conditions (i.e., non-essential components), so the resistor R323_3 is represented by dashed line in the figure.

Figure 19:
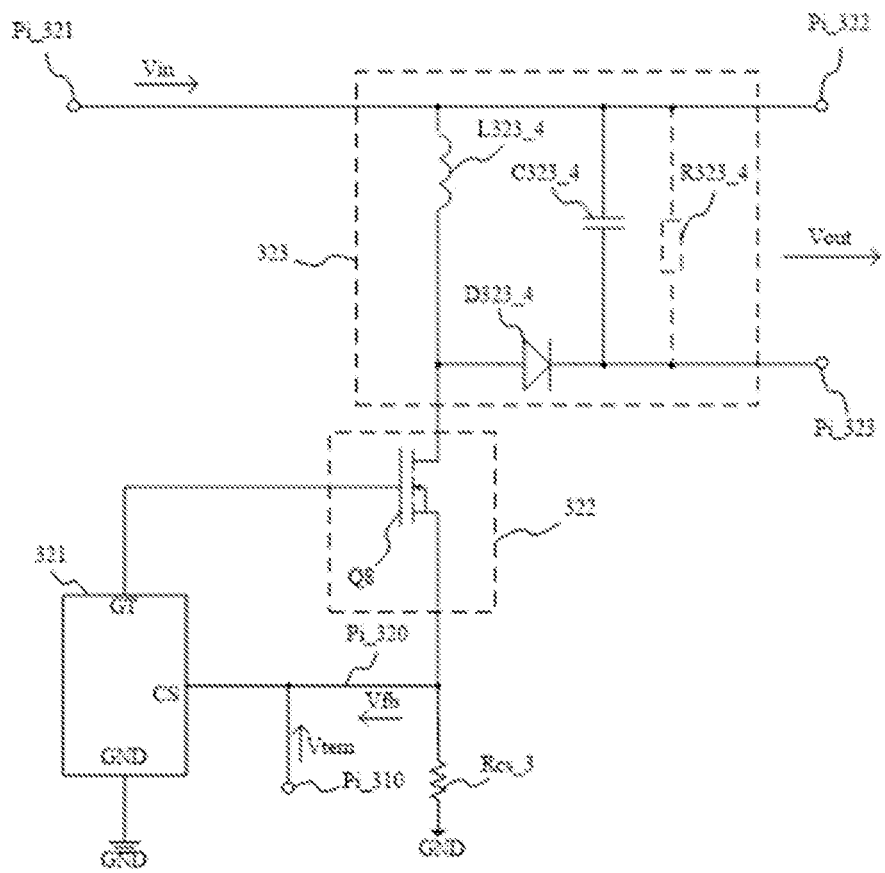
FIG. 19 depicts a schematic circuit structure diagram of a driving module of a temperature protection device in accordance with another embodiment of the present disclosure.

Please refer to FIG. 19, which depicts a schematic circuit structure diagram of a driving module of a temperature protection device in accordance with another embodiment of the present disclosure. As shown in the figure, the driving module includes a driving control circuit 321, a switch circuit 322, and a power conversion circuit 323. The power conversion circuit 323 has a first pin Pi_321, a first output end Pi_322, and a second output end Pi_323, and receives an external power supply signal Vin (DC signal) through first pin Pi_321 of the power conversion circuit 323 to perform energy conversion, such that a load power supply signal Vout can be outputted at the output end Pi_322 and the second output end Pi_323. The power conversion circuit 323 is coupled to the switch circuit 322. The switch circuit 322 is controlled by the driving control circuit 321.

As discussed herein, the power conversion circuit 323 includes an inductor L323_4, a freewheeling diode D323_4, and a capacitor C323_4. One end of the inductor L323_4 is connected to the first pin Pi_321, and the other end is coupled to the first end of the switch circuit 322. The capacitor C323_4 is coupled between the first output end Pi_322 and the second output end Pi_323 to stabilize the voltage difference between the first output end Pi_322 and the second output end Pi_323. The cathode of the freewheeling diode 2242_2 is coupled to the second output end Pi_323 and the anode is coupled to the first end of the switch circuit 322. The switch circuit 322 includes a switch Q8, which has a first end, a second end, and a control end, and the first end of the switch Q8 is configured as the first end of the switch circuit 322 to be coupled to the power conversion circuit 323. The second end of the switch Q8 is connected to the power ground GND through a sampling resistor Rcs_3, and the control end of the switch Q8 is coupled to the output pin GT of the driving control circuit 321. It should be noted that the sampling resistor Rcs_3 disposed between the second end of the switch Q8 and the power ground GND is configured to form a current measurement circuit that converts the current flowing through the switch Q8 into a voltage value to generate the feedback signal Vfb. When the switch Q8 is turned on, the feedback signal Vfb on the current measurement circuit can be collected and transmitted to the driving control circuit 321 through the load feedback end Pi_320.

The driving control circuit 321 determines the on and off timing of the switch Q8 based on the temperature sampling signal Vtem and the feedback signal Vfb. When the switch Q8 is turned on, the external power supply signal Vin flows in from the first pin Pi_321, through the inductor L323_4, the switch Q8, and the sampling resistor Rcs_3, and then into the second pin 221. At this time, the current flowing through the inductor L323_4 increases with time, and the inductor L323_4 is in the energy storage state; and the voltage of the capacitor C323_4 decreases with time, and the capacitor C323_4 is in the discharge state to maintain the voltage gap between the first output end Pi_322 and the second output end Pi_323. When the power switch Q8 is turned off, the inductor L323_4 is in a discharged state, and the current of the inductor L323_4 decreases with time. At this time, the current of the inductor L323_4 returns to the inductor L323_4 through the freewheeling diode D323_4, the second output end Pi_323, and the first output end Pi_322 to generate a freewheeling current. At this time, the capacitor C323_4 is in an energy storage state, and the voltage of the capacitor C323_4 increases with time. Therefore, the load power supply signal Vout is outputted at the first output end Pi_322 and the second output end Pi_323. It should be noted that, in order to prevent no-load operation of the driving module, in some embodiments, a resistor R323_4 is also connected in series between the first output end Pi_322 and the second output end Pi_323, since the resistor R323_4 can be increased or omitted depending on the actual implementation (i.e., non-essential components), so the resistor R323_4 is represented by dashed line in the figure.

The working principle of the driving module in FIGS. 17-19 performing the operation of reducing the output power to the load based on the temperature sampling signal Vtem is similar to that of FIG. 16, which will not be repeated herein.

In some practical circuits, during the moment that the load is energized or is struck by lightning, a large current (maybe more than 10 A) can be easily generated in the loop of the switching circuit, which may damage the current measurement circuit and the driving control circuit. The power conversion circuit discussed in at least one of the above illustrated examples may further include a clamping component, which can be connected to the current measurement circuit to perform a clamping operation to the loop of the current measurement circuit when the current flowing through the current measurement circuit or the voltage difference between the two ends of the current measurement circuit exceeds a preset value to limit the current flowing through the current measurement circuit. In some practical embodiments, the clamping component can be, for example, a plurality of diodes, and the plurality of diodes are connected in series to form a diode string, and the diode string and the current measurement circuit are connected in parallel with each other. Under this configuration, when a large current is generated in the loop of the switching circuit, the diode string connected in parallel to the current measurement circuit would quickly turn on, so that both ends of the current measurement circuit can be limited to a specific voltage level. For example, if the diode string includes 5 diodes, since the turn-on voltage of a single diode is about 0.7V, the diode string can clamp the cross voltage of the current measurement circuit to about 3.5V.

The temperature protection unit 32 corresponding to any one of the embodiments described in FIGS. 13-19 is only an illustrated example, and the configuration of the temperature protection unit 32 is not limited thereto. In some embodiments, the temperature protection unit 32 includes a heat dissipation module, which is disposed at the circuit to be protected and is coupled to the temperature sampling device 31, so that the heat dissipation module performs a heat dissipation operation based on the received temperature sampling signal Vtem. The heat dissipation module can include, for example, a fan, and the heat dissipation module controls the fan to rotate at a fixed rotation speed or a rotation speed corresponding to the magnitude of the temperature sampling signal Vtem, so as to dissipate heat from the circuit to be protected.

It should be noted that the temperature protection device 30 can be provided in an LED lighting system, that is, the circuit to be protected is an LED module, and the lighting system may include a high-power lighting system (for example, the output power to the LED module exceeds 30 W), or lighting system with dimming function, etc. When the lighting system is a high-power lighting system, the temperature protection unit 32 can be implemented as the temperature protection unit 32 in any of the embodiments of FIGS. 14-19; and when the lighting system is a lighting system with dimming function, the temperature protection unit 32 can include a dimming module coupled to the temperature sampling device 31 and configured to output a dimming signal for reducing the brightness of the LED load circuit in the LED lighting system based on the temperature sampling signal Vtem.

The temperature protection device provided in the above-discussed embodiments senses the ambient temperature of the circuit to be protected through a thermistor, which is low in cost, and achieves the effect of cooling the circuit to be protected by reducing the output power, which is energy-saving and safe. In addition, the temperature sampling device in the temperature protection device can be directly coupled to the pins of the driving control circuit in the temperature protection unit, the temperature protection function is realized with strong versatility without modification to the circuit of the temperature protection unit itself or further design of additional circuits due to compatibility.

Figure 20:
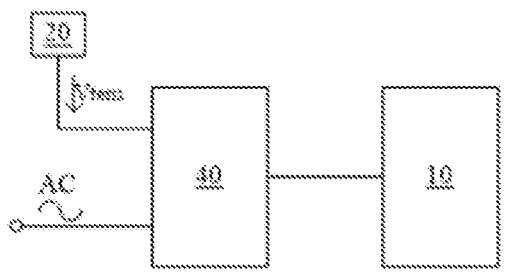
FIG. 20 depicts a schematic circuit block diagram of a LED lighting system in accordance with an embodiment of the present disclosure.

In possible implementations, this disclosure also provides an LED lighting system. Please refer to FIG. 20, which depicts a schematic circuit block diagram of a LED lighting system in accordance with an embodiment of the present disclosure. As shown in the figure, the LED lighting system includes the temperature sampling device 20, the switching power supply 40, and the LED load circuit 10 as described in any one of the previous-discussed embodiments of FIGS. 1-12C. Regarding the circuit structure and working principle of the temperature sampling device 20, please refer to the description corresponding to FIGS. 1-12C, which will not be repeated herein. The switching power supply 40 is coupled to the LED load circuit 10 and configured to convert the alternative current signal AC provided from the external AC power supply into the power supply signal of the LED load circuit 10. The switching power supply 40 is also coupled to the temperature sampling device 20, so that the switching power supply 40 can perform an operation of reducing output power to the LED load circuit based on the temperature sampling signal Vtem provided by the temperature sampling device 20. As discussed herein, the lighting system can include a high-power lighting system (e.g., the output power to the LED module exceeds 30 W), a lighting system with a dimming function, etc., which is not limited thereto.

In other embodiments, the switching power supply 40 can be referred as a power module, the LED load circuit 10 can be referred as an LED module, the temperature sampling device 20 can be referred as a temperature protection circuit, and the temperature sampling signal Vtem can be referred as a temperature protection signal Vtem. The LED lighting system includes a temperature protection circuit 20, a power supply module 40, and an LED module 10. The power module 40 is electrically connected to an external power source and is configured to receive an external power signal AC and generates a driving signal. The LED module 10 is electrically connected to the power module 40 for receiving the driving signal and lighting. The temperature protection circuit 20 is electrically connected to the power module 40 and is configured to sample the operating temperature of the power module 120 or the LED module 10 and generate a temperature protection signal Vtem based on the sampled temperature. The power module 40 receives the temperature protection signal Vtem and adjusts the output power based on the temperature protection signal Vtem. When the operating temperature is higher than a preset threshold, the power module 40 reduces the output power to reduce heat generation.

Through the configuration of this embodiment, the working temperature of the LED lamp can be controlled within the rated temperature, which ensures the normal operation of the LED lamp and prolongs the service life of the LED lamp.

Figure 21:
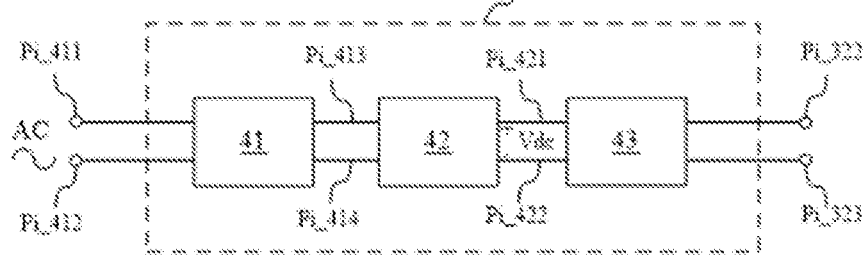
FIG. 21 depicts a circuit block diagram of a switching power supply in a LED lighting system in accordance with an embodiment of the present disclosure.

Please refer to FIG. 21, which depicts a circuit block diagram of a switching power supply in a LED lighting system in accordance with an embodiment of the present disclosure. As shown in the figure, the switching power supply 40 includes a rectifier module 41, a filter module 42, and a driving module 43. The rectification module 41 receives the alternative current signal AC outputted by the external AC power supply through the first rectifier input end Pi_411 and the second rectifier input end Pi_412 of the rectification module 41, rectifies the alternative current signal AC, and then outputs the rectified signal from the first rectifier output end Pi_413 and the second rectifier output end Pi_414. The filter module 42 is coupled to the rectifier module 41 and is configured to receive and filter the rectified signals outputted by the first rectifier output end Pi_413 and the second rectifier output end Pi_414 and output the power supply signal Vdc at the first filtered output end Pi_421 and the second filtered output end Pi_422. The driving module 43 is coupled to the filtering module 42 and is configured to perform energy conversion to the filtered rectified signal to supply power to the LED load. The driving module 43 is also coupled to the temperature sampling device 20 to perform an operation of reducing the output power to the LED load circuit based on the temperature sampling signal Vtem. As discussed herein, the second rectifier input end Pi_412, the second rectifier output end Pi_414, and the second filtered output end Pi_422 are referred as reference low electric potential ends, which are connected to the power ground GND or the reference ground SGND.

Figure 22:
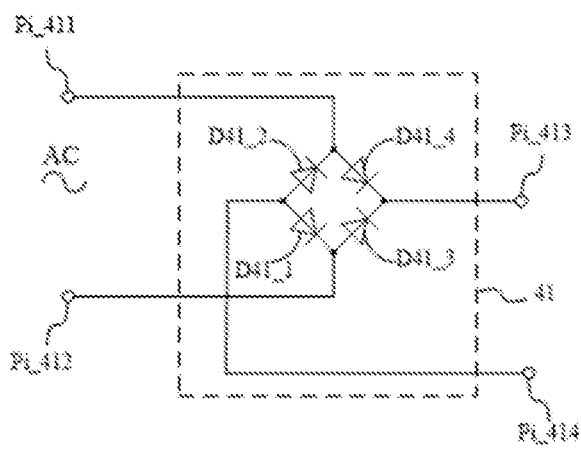
FIG. 22 depicts a schematic circuit structure diagram of a rectifier module in a LED lighting system in accordance with an embodiment of the present disclosure.

Please refer to FIG. 22, which depicts a schematic circuit structure diagram of a rectifier module in a LED lighting system in accordance with an embodiment of the present disclosure. As shown in the figure, the rectifier module 41 is a bridge rectifier circuit, and the rectifier module 24 has a first rectifier input end Pi_411, the second rectifier input end Pi_412, the first rectifier output end Pi_413, and the second rectifier output end Pi_414. The rectifier module 24 further includes a first rectifier diode D41_1, a second rectifier diode D41_2, a third rectifier diode D41_3, and a fourth rectifier diode D41_4, which are configured to perform full-wave rectification of the received alternative current signal AC. The anode of the first rectifier diode D41_1 is coupled to the second rectifier output end Pi_414, and the cathode of the first rectifier diode D41_1 is coupled to the second rectifier input end Pi_412. The anode of the second rectifier diode D41_2 is coupled to the second rectifier output end Pi_414, and the cathode of the second rectifier diode D41_2 is coupled to the first rectifier input end Pi_411. The anode of the third rectifier diode D41_3 is coupled to the second rectifier input end Pi_412, and the cathode of the third rectifier diode D41_3 is coupled to the first rectifier output end Pi_413. The anode of the fourth rectifier diode D41_4 is coupled to the first rectifier input end Pi_411, and the cathode of the fourth rectifier diode D41_4 is coupled to the first rectifier output end Pi_413.

When the first rectifier input end Pi_411 and the second rectifier input end Pi_412 receive an external alternative current signal AC, the operation of the rectification module 41 is described as follows. When the alternative current signal AC is in the positive half wave, the alternative current signal AC flows in through the first rectifier input end Pi_411, the fourth rectifier diode D41_4 and the first rectifier output end Pi_413 in sequence, and then flows through the second rectifier output end Pi_414, the first rectifier diode D41_1 and the first rectifier output end Pi_412 in sequence. When the alternative current signal AC is in the negative half wave, the alternative current signal AC signal flows in through the second rectifier input end Pi_412, the third rectifier diode D41_3, and the first rectifier output end Pi_413 in sequence, and then flows through the second rectifier output end Pi_414, the second rectifier diode D41_2 and the first rectifier input end Pi_411 in sequence. Therefore, regardless of whether the alternative current signal AC is in a positive half-wave or a negative half-wave, the positive pole of the rectified signal of the rectifier module 41 is located at the first rectifier output end Pi_413, and the negative pole is located at the second rectifier output end Pi_414. Based on the above operation description, the rectified signal outputted by the rectifier module 41 is a full wave rectified signal.

The structure of the rectifier module 41 is not limited thereto, and the rectifier module 41 may also be other types of full-wave rectifier circuits or half-wave rectifier circuits, which does not affect the functions to be achieved by the solution of the present disclosure.

Figure 23:
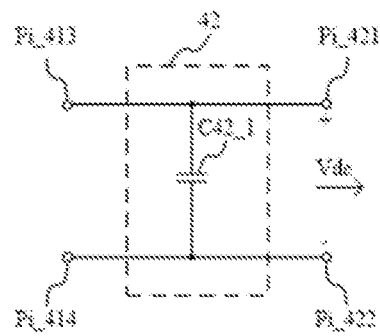
FIG. 23 depicts a schematic circuit structure diagram of a filter module of a LED lighting system in accordance with an embodiment of the present disclosure.

Please refer to FIG. 23, which depicts a schematic circuit structure diagram of a filter module of a LED lighting system in accordance with an embodiment of the present disclosure. As shown in the figure, the filter module 42 includes a capacitor C42_1. One end of the capacitor C42_1 is coupled to the first rectifier output end Pi_413 and the first filtered output end Pi_421, and the other end is coupled to the second rectifier output end Pi_414 and the second filtered output end Pi_422, to perform a lowpass filtering to the rectified signal outputted from the first rectifier output end Pi_413 and the second rectifier output end Pi_414, so as to filter out the high frequency components in the rectified signal and generate a filtered signal to be outputted by the first filtered output end Pi_421 and the second filtered output end Pi_422 as the power supply signal Vdc.

Figure 24:
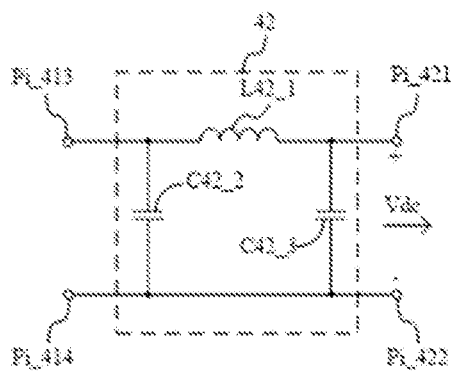
FIG. 24 depicts a schematic circuit structure diagram of a filter of a LED lighting system in accordance with another embodiment of the present disclosure.

Please refer to FIG. 24, which depicts a schematic circuit structure diagram of a filter of a LED lighting system in accordance with another embodiment of the present disclosure. As shown in the figure, the filter module 42 includes a π-type filter circuit. The π-type filter circuit includes a capacitor C42_2, an inductor L42_1, and a capacitor C42_3. The π-type filter circuit is similar the symbol "π" in shape or structure. One end of the capacitor C42_2 is connected to the first rectifier output end Pi_413 and coupled to the first filter output end Pi_421 through the inductor L42_1. The other end of the capacitor C42_2 is connected to the second rectifier output end Pi_414 and the second filtered output end Pi_422. The inductor L42_1 is coupled between the first rectifier output end Pi_413 and the first filtered output end Pi_421. One end of the capacitor C42_3 is connected to the first filtered output end Pi_421 and is coupled to the first rectifier output end Pi_413 through the inductor L42_1, and the other end is connected to the second rectifier output end Pi_414 and the second filtered output end Pi_422.

As seen between the rectifier output ends Pi_413, Pi_414 and the filtered output ends Pi_421, Pi_422, the filter module shown in FIG. 24 further includes an inductor L42_1 and a capacitor C42_3 in comparison with the filter module in FIG. 23. The inductor L42_1 and the capacitor C42_3 can achieve a low-pass filter function similar to that of the capacitor C42_1. Therefore, comparing to the filtering unit in FIG. 23, the filtering unit shown in FIG. 24 can filter out high-frequency signals better and output a filtered signal with a smoother waveform.

In the embodiment shown in FIG. 24, the inductance value of the inductor L42_1 is preferably selected from the range of 10 nH to 10 mH. The capacitance of the capacitor C42_1 in FIG. 23 and the capacitors C42_2 and C42_3 in FIG. 24 are preferably selected from the range of 100 pF to 1 uF.

The structure of the filter module 42 is not limited thereto. The filter module 42 can also be other types of circuit such as LC filter circuit, RC filter circuit, LCπ filter circuit, RCπ filter circuit, etc., which does not affect the functions to be achieved by the solution of the present disclosure.

In some embodiments, the driving module 43 can be implemented by the driving module as described in any one of the embodiments in FIGS. 14-19, where the external power supply signal Vin received by the driving module in FIGS. 14-19 is the power supply signal Vdc outputted by the filter module 42. The load power supply signal Vout outputted by the driving module 42 are configured as the power supply signal of the LED load circuit. For the circuit structure and working principle of the driving module, please refer to the description of FIGS. 14-19, which will not be repeated herein.

Figure 25:
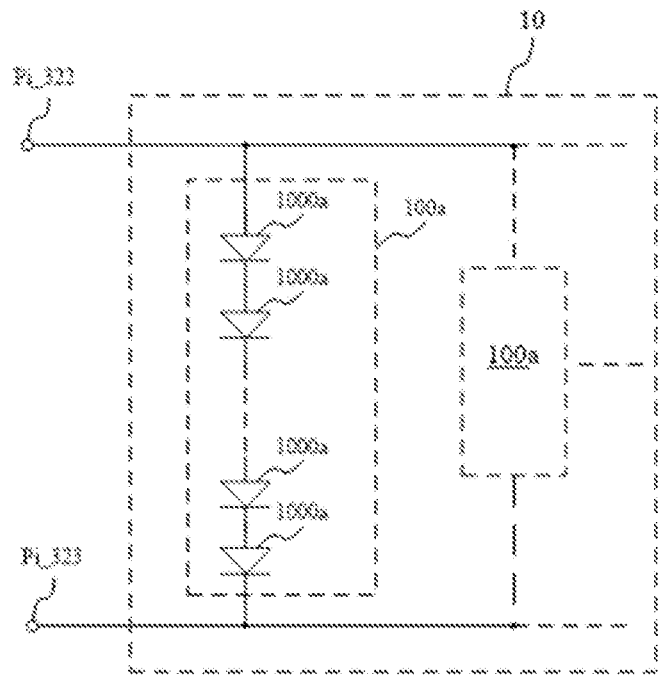
FIG. 25 depicts a schematic structural diagram of an LED load circuit of a LED lighting system in accordance with an embodiment of the present disclosure.

Please refer to FIG. 25, which depicts a schematic structural diagram of an LED load circuit of a LED lighting system in accordance with embodiment of the present disclosure. As shown in the figure, the positive end of the LED load circuit 10 is coupled to the first output end Pi_322 of the driving module. The negative end is coupled to the second output end Pi_323 of the driving module. The LED load circuit 10 includes at least one LED unit 100a, and the LED units 100a are connected in parallel when there are more than two LED unit 100a. The positive end of each LED unit is coupled to the positive end of the LED load circuit 10 to be coupled to the first output end Pi_322; and the negative end of each LED unit is coupled to the negative end of the LED load circuit 10 to be coupled to the second output end Pi_323. The LED unit 100a includes at least one LED component 1000a, i.e., the light source of the LED lamp. the LED components 1000a are connected in series to form a string when there are multiple LED components 1000a. The anode of the first LED component 1000a is coupled to the positive end of the associated LED unit 100a, and the cathode of the first LED component 1000a is coupled to the next (the second) LED component 1000a. The anode of the last LED component 1000a is coupled to the cathode of the previous LED component 1000a, and the cathode of the last LED component 1000a is coupled to the negative end of the LED unit 100a.

Figure 26:
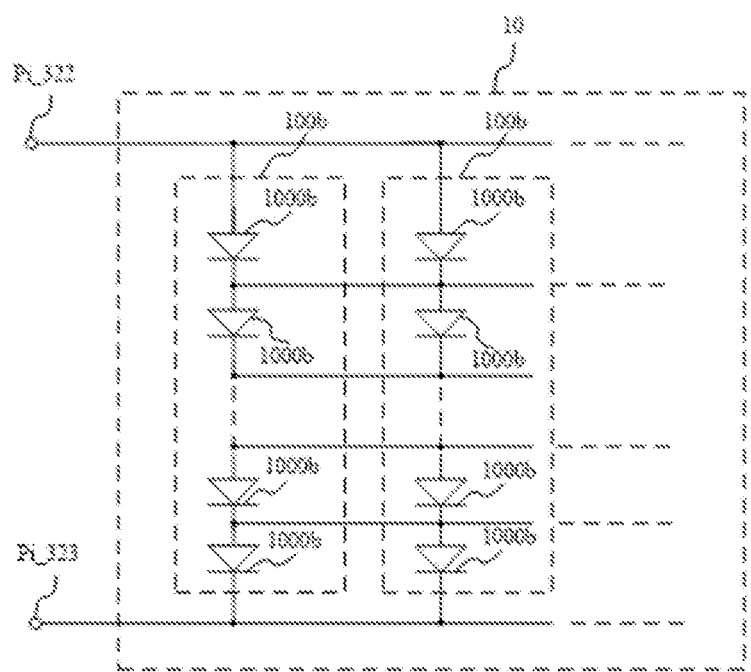
FIG. 26 depicts a schematic structural diagram of an LED load circuit of a LED lighting system in accordance with another embodiment of the present disclosure.

Please refer to FIG. 26, depicts a schematic structural diagram of an LED load circuit of a LED lighting system in accordance with another embodiment of the present disclosure. As shown in the figure, the positive end of the LED load circuit 10 is coupled to the first output end Pi_322 of the driving module, and the negative end is coupled to the second output end Pi_323 of the driving module. The LED load circuit 10 of this embodiment includes at least two LED units 100b, and the positive end of each LED unit 100b is coupled to the positive end of the LED load circuit 10, and the negative end of each LED unit 100b is coupled to the negative end of the LED load circuit 10. The LED unit 100b includes at least two LED components 1000b. The connection relationship of the LED components 1000b in the associated LED unit 100b is the same as described in FIG. 25, the cathode of the LED component 1000b is coupled to the anode of the next LED component 1000b. The anode of the first LED component 1000b is coupled to the positive end of the associated LED unit 100b, and the cathode of the last LED component 1000b is coupled to the negative end of the associated LED unit 100b. Furthermore, the LED units 100b in this embodiment are also connected to each other. The anode of the n-th LED component 1000b of each LED unit 100b is connected to each other, and the cathode is also connected to each other. Therefore, the connection between the LED components of the LED load circuit 10 of this embodiment is a mesh connection. In practical implementations, the number of LED components 1000*b* included in the LED unit 100*b* is preferably 15-25, more preferably 18-22.

Figure 27:
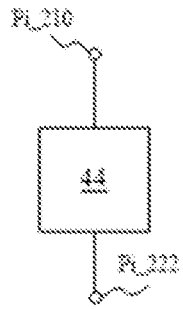
FIG. 27 depicts a circuit block diagram of an activation protection circuit of a LED lighting system in accordance with an embodiment of the present disclosure.

In addition, in order to prevent the LED load circuit from being damaged or unable to start normally due to voltage overshoot when the LED load circuit is just powered on, in some embodiments, the LED lighting system further includes an activation protection circuit 44. Please refer to FIG. 27 in conjunction with FIGS. 1-12C, FIG. 27 depicts a circuit block diagram of an activation protection circuit of a LED lighting system in accordance with an embodiment of the present disclosure. As shown in the figure, the activation protection circuit 44 is coupled between the measurement end Pi_210 of the temperature measurement unit 21 and the reference end Pi_222 of the temperature sampling device 20 that provides the first reference signal. The activation protection circuit 44 is configured to perform an activation protection to the LED load circuit using temperature sampling signal Vtem when the LED lighting system is powered on.

Figure 28:
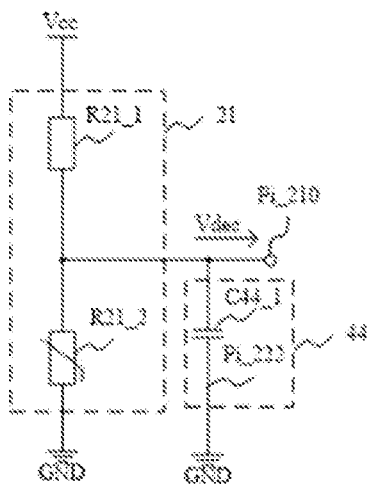
FIG. 28 depicts a circuit block diagram of an activation protection circuit of a LED lighting system in accordance with an embodiment of the present disclosure.

Please refer to FIG. 28, which depicts a circuit block diagram of an activation protection circuit of a LED lighting system in accordance with an embodiment of the present disclosure. For ease of explanation to the principle of activation protection provided by the activation protection circuit, in this figure, the temperature measurement unit 21 shown in FIG. 2 and the thermistor R21_2 is NTC thermistor are taken as an example. As shown in the figure, the activation protection circuit 44 includes a capacitor C44_1. One end of the capacitor C44_1 is coupled to the measurement end Pi_210 of the temperature measurement unit 21, and the other end is coupled to the reference end Pi_222 (shown as the reference end Pi_222 being connected to the power ground GND in FIG. 28). When the lighting system is powered on, since the voltage on the capacitor C44_1 is not able to change suddenly, the power supply Vcc charges the capacitor C44_1 during the initial power-on stage, and the voltage on the capacitor C44_1 slowly rises from zero, that is, the measurement signal Vdec is small during the initial power-on stage. At this time, based on the condition that the resistance value of the thermistor R21_2 is small, and also the working principle of the signal processing unit 22 described above with respect to FIG. 5, it can be understood that the smaller the resistance value of the thermistor R21_2 is, the larger the temperature sampling signal Vtem outputted by the signal processing unit 22 is. As a result, during the initial power-on stage, the temperature sampling signal Vtem is very large, so that the power output from the driving module to the LED load circuit is very small, and brightness of the LED module of the LED load circuit is very dark. As the voltage on the capacitor C44_1 increases slowly, the temperature sampling signal Vtem slowly decreases, and the driving module slowly increases the power output to the LED load circuit based on the temperature sampling signal Vtem, so that the brightness of the LED module of the LED load circuit slowly changes from dark to bright, and the LED load circuit completes the soft-start process.

The LED lighting system provided in the above-described embodiments sense the ambient temperature of the LED load circuit through the thermistor, and achieve the effect of cooling the LED load circuit by reducing the output power, which is low in cost, energy-saving and safe. In addition, a temperature sampling device can be directly coupled with the pins of the switching power supply in the existing LED lighting system, the temperature protection function is realized with strong versatility without modification to the circuit of the temperature protection unit itself or further design of additional circuits due to compatibility.

Figure 29:
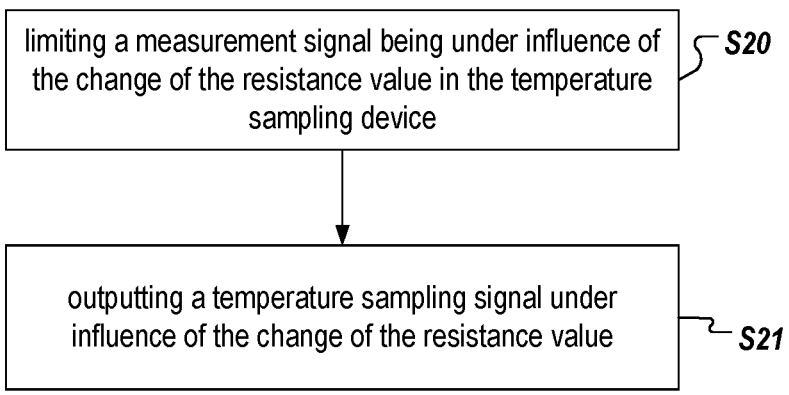
FIG. 29 depicts a flow chart of a temperature sampling method in accordance with an embodiment of the present disclosure.

In possible implementations, the present disclosure also provides a temperature sampling method, which can be applied to a temperature sampling device, where the temperature sampling device includes a circuit that changes the resistance value as the ambient temperature changes. Please refer to FIG. 29, which depicts a flow chart of a temperature sampling method in accordance with an embodiment of the present disclosure. As shown in the figure, the temperature sampling method includes step S20 and step S21.

In step S20, the measurement signal in the temperature sampling device being under influence of the change of the resistance value is limited.

As discussed herein, the temperature sampling device includes a temperature measurement unit and a signal processing unit. The resistance value of the temperature measurement unit changes under influence of ambient temperature changes of the circuit to be protected. The measurement signal is an electric signal outputted by the temperature measurement unit that is under influence of the change of the resistance value. For details of the working process regarding the circuit structure of the temperature measurement unit and how the measurement signal being under influence of the resistance value change, please refer to the description of FIG. 2 and FIG. 3, which will not be repeated herein.

The signal processing unit includes an amplification module and a feedback module, and the feedback module limits the measurement signal in the temperature sampling device that is under influence of the resistance value change. Please refer to FIG. 4 to FIG. 7, each of the embodiments illustrates the detailed process of the feedback module 221 limiting the measurement signal Vdec, which will not be repeated herein. Based on FIGS. 11-25 and corresponding descriptions thereof, the feedback module 221 generates a feedback signal FB based on the temperature sampling signal Vtem outputted by the signal processing unit 22 to limit the change of the measurement signal Vdec.

In step 21, a temperature sampling signal under influence of the change of the resistance value is outputted, wherein the temperature sampling signal is generated under condition of the measurement signal is limited.

The signal processing unit includes an amplifying module and a feedback module, and the amplifying module outputs a temperature sampling signal corresponding to change of the resistance value. Please refer to FIG. 4 to FIG. 12C, each embodiment illustrates the detailed process of the amplifying module 222 outputting the temperature sampling signal Vtem, which will not be repeated herein. Based on FIGS. 4-12C and corresponding descriptions thereof, the amplifying module 222 amplifies the signal received from input end Pi_221 of the amplifying module 222 based on the limited measurement signal Vdec, so as to output a temperature sampling signal Vtem corresponding to the resistance value change of the temperature measurement unit 21.

Figure 30:
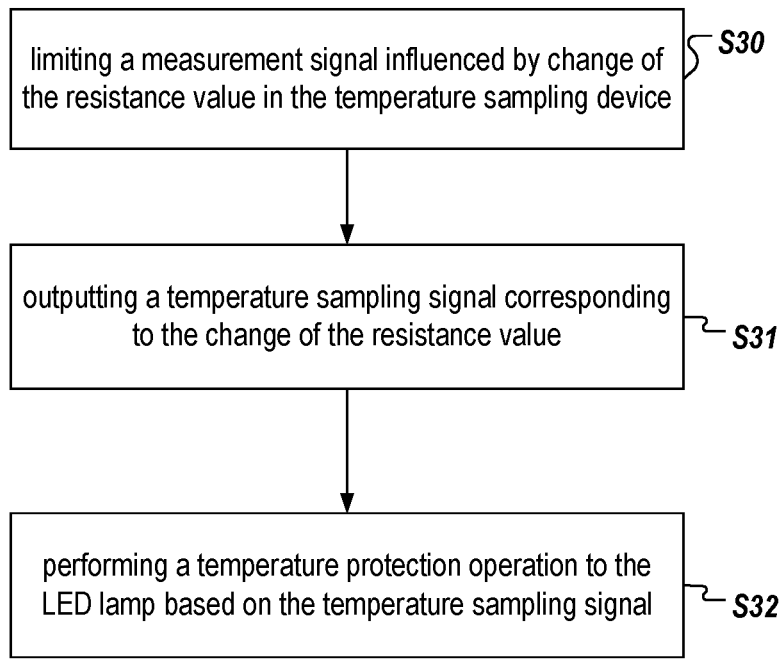
FIG. 30 depicts a flow chart of a temperature protection method of a LED lamp in accordance with an embodiment of the present disclosure.

In possible implementations, the present disclosure also provides a temperature protection method for an LED lamp, and the temperature protection method can be applied to a temperature protection device. Please refer to FIG. 30, which depicts a flow chart of a temperature protection method of a LED lamp in accordance with an embodiment of the present disclosure. As shown in the figure, the temperature protection method of the LED lamp includes step S30, step S31, and step S32.

In step S30, a measurement signal in a temperature sampling device influenced by a change of a resistance value is limited.

The temperature protection device includes the temperature sampling device and a temperature protection unit. The temperature sampling device includes a temperature measurement unit and a signal processing unit. The resistance value of the temperature measurement unit would be changed by the ambient temperature of the circuit to be protected. The measurement signal is an electric signal outputted by the temperature measurement unit and changes under the influence of the change of the resistance value of the temperature measurement unit. For the details of the circuit structure of the temperature measurement unit and working process of the measurement signal influenced by the change of the resistance value, please refer to the description of FIG. 2 and FIG. 3, which will not be repeated herein.

The signal processing unit includes an amplification module and a feedback module, and the feedback module limits the measurement signal in the temperature sampling device that is under the influence of the resistance value change. Please refer to FIG. 4 to FIG. 7, each embodiment illustrates the detailed process of the feedback module 221 limiting the measurement signal Vdec, which will not be repeated herein. Based on FIG. 4 to FIG. 7 and corresponding description thereof, the feedback module 221 generates the feedback signal FB based on the temperature sampling signal Vtem outputted by the signal processing unit 22 to limit the change of the measurement signal Vdec.

In step S31, a temperature sampling signal corresponding to the change in the resistance value is outputted; the temperature sampling signal is generated under condition of the measurement signal is limited.

The signal processing unit includes an amplifying module and a feedback module, and the amplifying module outputs a temperature sampling signal corresponding to the resistance value change. Please refer to FIG. 4 to FIG. 12C, in which each embodiment illustrates the detailed process of the amplifying module 222 outputting the temperature sampling signal Vtem, which will not be repeated herein. Based on FIGS. 4-12C and corresponding descriptions, the amplifying module 222 amplifies the signal received by the input end Pi_221 of the amplifying module 222 based on the limited measurement signal Vdec, so as to output a temperature sampling signal Vtem corresponding to the resistance value change of the temperature measurement unit 21.

In step S32, a temperature protection operation of the LED lamp is performed based on the temperature sampling signal.

The temperature protection unit is coupled to the temperature sampling device to receive the temperature sampling signal outputted by the temperature sampling device and perform a temperature protection operation of the LED lamp based on the temperature sampling signal.

In an embodiment, the temperature protection unit includes a switching power supply in the LED lamp, and the switching power supply reduces the output power supply based on the temperature sampling signal. Please refer to FIG. 14 to FIG. 24, each embodiment illustrates the detailed process of the switching power supply 40 reducing the output power based on the temperature sampling signal Vtem, which will not be repeated herein. Based on FIGS. 14-24 and corresponding descriptions thereof, the driving module in the switching power supply 40 is configured to reduce the output power based on the temperature sampling signal Vtem, and the driving control circuit 321 in the driving module determines the on-off timing of the switch in the switch circuit 322. When the temperature sampling signal Vtem is larger, the driving control circuit 321 controls the on and off timing of the switch circuit 322 to achieve the purpose of reducing the load current Ics, so as to reduce the power output to the load, i.e., the power supply by the switching power supply 40.

In another embodiment, the LED lamp is an LED lamp with a dimming function, and the temperature protection unit includes a dimming module in the LED lamp, and the dimming module adjusts the outputted dimming signal based on the temperature sampling signal to decrease the brightness of the LED light when the temperature rises.

In another embodiment, the temperature protection unit includes a heat dissipation device, which is disposed at the circuit to be protected and is coupled to the temperature sampling device, so that the heat dissipation device performs a heat dissipation operation based on the received temperature sampling signal. The heat dissipation device can include, for example, a fan, and the heat dissipation device controls the fan to rotate at a fixed rotation speed or a rotation speed corresponding to the magnitude of the temperature sampling signal based on the temperature sampling signal, so as to dissipate heat from the circuit to be protected.

The temperature sampling device, temperature protection device and method, and lighting system provided in the present disclosure sense the ambient temperature of the LED load circuit through a thermistor and achieve the effect of cooling the LED load circuit by reducing the output power, which is low cost, energy saving and safe. In addition, the temperature sampling device can be directly coupled with the pins of the switching power supply in the existing LED lighting system, the temperature protection function is realized with strong versatility without modification to the circuit of the temperature protection unit itself or further design of additional circuits due to compatibility.

The above-discussed embodiments only exemplarily illustrate the principles and effects of the present disclosure and are not used to limit the present disclosure. Anyone familiar with this technology can modify or change the above-mentioned embodiments without departing from the spirit and scope of this application. Therefore, all equivalent modifications or changes made by those with ordinary knowledge in the technical field without departing from the spirit and technical ideas disclosed in this application should still be covered by the claims of this application.

What is claimed is:

1. A temperature sampling device, comprising:
   a temperature measurement unit with a measurement end, configured to change a resistance value of the temperature measurement unit under influence of a change of an ambient temperature of a circuit to be protected; and
   a signal processing unit, including at least a feedback circuit, the signal processing unit coupled to the measurement end, and configured to limit a measurement signal in the temperature measurement unit influenced by the change of the resistance value, and to output a temperature sampling signal corresponding to the change of the resistance value,
   wherein the temperature sampling signal is generated under a condition of the measurement signal being limited, and wherein, the temperature sampling signal is configured to be transmitted to a temperature protection device.

2. The temperature sampling device of claim 1, wherein monotonicity exists between the change of the resistance value and the change of the ambient temperature.

3. The temperature sampling device of claim 1, wherein the temperature sampling signal is outputted when the ambient temperature reaches an initial protection temperature.

4. The temperature sampling device of claim 1, wherein monotonicity exists between the change of the temperature sampling signal and the change of the resistance value.

5. The temperature sampling device of claim 1, wherein the signal processing unit transfers from a first state to a second state based on a change of the measurement signal; wherein, during the second state, the signal processing unit generates the temperature sampling signal, and during the first state, the signal processing unit is not activated.

6. The temperature sampling device of claim 1, wherein the temperature measurement unit comprises a thermistor and a voltage dividing resistor connected in series, and the measurement end is located between the thermistor and the voltage dividing resistor.

7. The temperature sampling device of claim 6, wherein the thermistor comprises a variable resistor and resistance of the variable resistor changes in a same direction as the ambient temperature changes.

8. The temperature sampling device of claim 6, wherein the thermistor comprises a variable resistor and resistance of the variable resistor changes in a reverse direction as the ambient temperature changes.

9. The temperature sampling device of claim 1, wherein the signal processing unit comprises:
an amplifying module, wherein an input end of the amplifying module is coupled to the measurement end, a first reference signal is fed into a reference end of the amplifying module, and the output end of the amplifying module outputs the temperature sampling signal; and
a feedback module, coupled between the measurement end and the output end of the amplifying module, and configured to feed back a feedback signal generated based on the temperature sampling signal to the measurement end to limit change of the measurement signal,
wherein the amplifying module amplifies a signal received by the input end based on the limited measurement signal to output the temperature sampling signal.

10. The temperature sampling device of claim 9, wherein the feedback module is configured to determine that a variation range of the resistance value of the temperature measurement unit corresponds to a preset signal magnitude variation range of the temperature sampling signal.

11. The temperature sampling device of claim 9, wherein the amplifying module comprises a transistor connected to a circuit between the reference end and the output end of the amplifying module, and a control end of the transistor is coupled to the input end of the amplifying module.

12. The temperature sampling device of claim 9, wherein the amplifying module comprises at least two cascaded transistors, a control end of a first-stage transistor is coupled to the measurement end, and a last-stage transistor is connected to a circuit between the reference end and the output end of the amplifying module.

13. The temperature sampling device of claim 9, wherein the amplifying module comprises an operational amplifier, two input ends of the operational amplifier are respectively coupled to the input end and the reference end of the amplifying module, and an output end of the operational amplifier is coupled to the output end of the amplifying module.

14. The temperature sampling device of claim 1, further comprising an output unit coupled to an output end of the signal processing unit to output the temperature sampling signal.

15. The temperature sampling device of claim 14, wherein the output unit comprises:
a voltage follower module, wherein an input end of the voltage follower module is coupled to the output end of the signal processing unit, the reference end of the voltage follower module receives a second reference signal, and an output end of the voltage follower module outputs the temperature sampling signal.

16. The temperature sampling device based on claim 15, wherein the voltage follower module comprises:
a transistor connected between the input end and the reference end of the voltage follower module, and the transistor is further connected to the output end of the voltage follower module to output the temperature sampling signal.

17. The temperature sampling device of claim 1, further comprising a filter unit, coupled to an output end of the signal processing unit, and configured for signal filtering.

18. The temperature sampling device of claim 1, wherein the circuit to be protected comprises at least one of the following:
a switching power supply, an electronic component for which performance thereof is reduced/lost by heat, and an LED load circuit.

19. An LED lighting system, comprising:
the temperature sampling device of claim 1;
an LED load circuit, driven by DC power supply; and
a switching power supply, coupled to the LED load circuit, configured to convert an AC signal provided by an external AC power supply into a power supply signal for the LED load circuit,
wherein, the switching power supply is further coupled to the temperature sampling device, and performs an operation of reducing the output power to the LED load circuit based on the temperature sampling signal provided by the temperature sampling device.

20. The temperature sampling device of claim 1, wherein the signal processing unit further includes one or more active circuit components.

21. An LED lighting system comprising:
a temperature sampling device comprising:
a temperature measurement unit with a measurement end, configured to change a resistance value of the temperature measurement unit under influence of a change of an ambient temperature of a circuit to be protected; and
a signal processing unit, coupled to the measurement end, and configured to limit a measurement signal in the temperature measurement unit influenced by the change of the resistance value, and to output a temperature sampling signal corresponding to the change of the resistance value;
an LED load circuit, driven by DC power supply; and
a switching power supply, coupled to the LED load circuit, configured to convert an AC signal provided by an external AC power supply into a power supply signal for the LED load circuit,
wherein the temperature sampling signal is generated under a condition of the measurement signal being limited, and wherein, the temperature sampling signal is configured to be transmitted to a temperature protection device, wherein, the switching power supply is further coupled to the temperature sampling device, and performs an operation of reducing the output power to the LED load circuit based on the temperature sampling signal provided by the temperature sampling device, and wherein the switching power supply comprises:

a rectifier module, configured to rectify the AC signal and output a rectified signal;

a filter module, coupled to the rectifier module and configured to filter the rectified signal and output the rectified signal; and a driving module, coupled to the filter module, and configured to perform a power conversion to the filtered rectified signal to supply to the LED load, wherein, the driving module is further coupled to the temperature sampling device, and performs an operation of reducing the output power to the LED load circuit based on the temperature sampling signal.

22. The LED lighting system of claim 21, wherein the LED lighting system comprises: a lighting system with an output power higher than 30 W.

23. A temperature protection method for an LED lamp, comprising the steps of:

limiting a measurement signal influenced by change of a resistance value in a temperature sampling device by using at least one of: a feedback circuit, and one or more active circuit components;

outputting a temperature sampling signal corresponding to the change of the resistance value, wherein the temperature sampling signal is generated under a condition of the measurement signal being limited and is configured to be transmitted to a temperature protection device; and performing a temperature protection operation to the LED lamp based on the temperature sampling signal, wherein the step of outputting the temperature sampling signal corresponding to the change of the resistance value comprises:

generating the temperature sampling signal when the measurement signal indicates a measured temperature reaches an initial protection temperature; and not generating the temperature sampling signal when the measurement signal indicates the measured temperature does not reach the initial protection temperature.

24. The temperature protection method of claim 23, wherein the step of performing a temperature protection operation on the LED lamp based on the temperature sampling signal comprises at least one of the following:

reducing a supply power from a switching power supply in the LED lamp based on the temperature sampling signal;

adjusting a dimming signal outputted by a dimming module in the LED lamp based on the temperature sampling signal to reduce a brightness of the LED lamp when the temperature rises; and performing a heat dissipation operation based on the temperature sampling signal by a heat dissipation device provided at the circuit, to protect the LED lamp.

25. The temperature protection method of claim 23, further comprising:

additionally using one or more active circuit components to limit the measurement signal influenced by the change of the resistance value in the temperature sampling device.

\* \* \* \* \*